(12) United States Patent
Morrison et al.

(10) Patent No.: US 6,215,477 B1
(45) Date of Patent: Apr. 10, 2001

(54) TOUCH SENSITIVE DISPLAY PANEL

(75) Inventors: Gerald D. Morrison; Lucien N. Potvin, both of Calgary (CA)

(73) Assignee: Smart Technologies Inc. (CA)

( * ) Notice: Subject to any disclaimer, the term of this patent is extended or adjusted under 35 U.S.C. 154(b) by 0 days.

(21) Appl. No.: 08/955,568

(22) Filed: Oct. 22, 1997

(51) Int. Cl.[7] .................................................. G09G 5/00
(52) U.S. Cl. ..................... 345/173; 178/18.03; 178/18.02
(58) Field of Search .................................... 345/173, 174, 345/175, 176, 177, 179, 60; 178/18.01, 18.02, 18.03, 18.1

(56) References Cited

U.S. PATENT DOCUMENTS

| | | | |
|---|---|---|---|
| 4,290,061 | * | 9/1981 | Serrano ................................ 345/174 |
| 4,897,510 | * | 1/1990 | Tanaka et al. ......................... 178/18 |
| 5,053,757 | * | 10/1991 | Meadows ............................. 345/173 |
| 5,402,151 | * | 3/1995 | Duwaer ............................... 345/173 |
| 5,731,801 | * | 3/1998 | Fukuzaki ............................. 345/146 |
| 5,777,604 | * | 7/1998 | Okajima et al. ..................... 345/173 |

* cited by examiner

*Primary Examiner*—Kent Chang
(74) *Attorney, Agent, or Firm*—Fitzpatrick, Cella, Harper & Scinto

(57) ABSTRACT

A touch sensitive display panel comprises a noisy display panel having a display screen on which images are displayed. An electronic writeboard is provided on the noisy display panel and overlies the display screen. Images displayed on the display screen are visible through the electronic writeboard. The electronic writeboard detects user input and provides output to alter displayed images. The electronic writeboard includes means to compensate for noise generated by the noisy display panel.

35 Claims, 19 Drawing Sheets

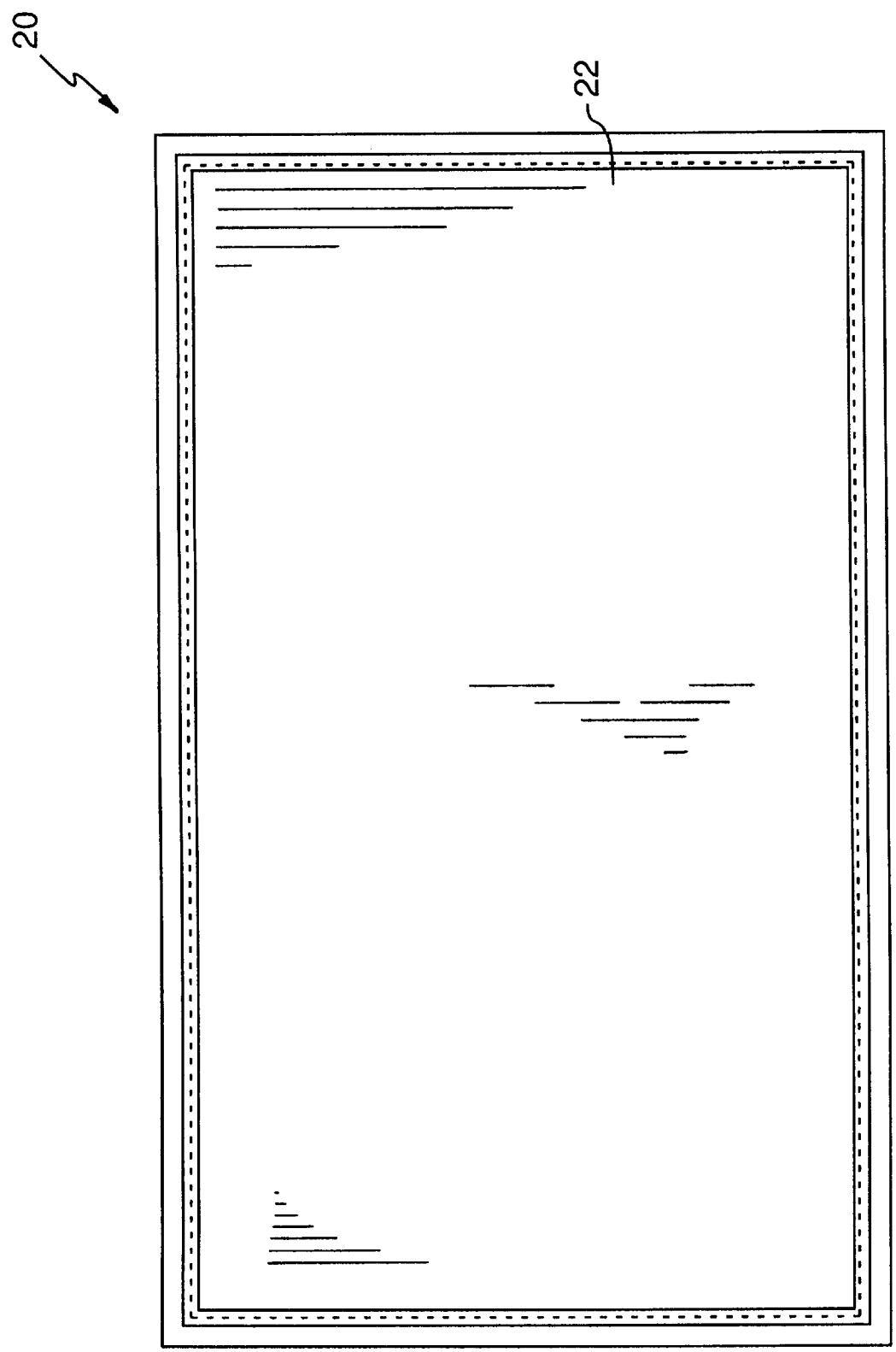

Negative envelope

TOUCH SENSITIVE DISPLAY PANEL

FIELD OF THE INVENTION

The present invention relates to electronic writeboards and in particular to a touch sensitive display panel and an electronic writeboard for a noisy display panel.

BACKGROUND OF THE INVENTION

Electronic writeboards are known in the art and have been used in conjunction with multimedia and communications software to provide enhanced teleconferencing capabilities. Conventional electronic writeboards have typically been of the resistive air gap (RAG) type and include a multi-layer transparent, flexible, touch sensitive panel. The touch sensitive display panel generates control signals in response to pressure applied thereto representing the locations of the applied pressure. A processor receives the control signals and in response generates graphic images which are displayed on the passive display panel to update the displayed images. These electronic writeboards are generally used with the passive display panel either in a stand alone mode or in a projection mode. Since passive display panel make use of passive optical elements, the passive display panels do not emit stray noise signals which impact adversely the operation of RAG type electronic writeboards.

Plasma displays panels have however, begun to replace passive display panels due to the fact that they are brighter than passive projection display panels and provide greater economical offerings. Unfortunately, plasma display panels are noisy and emit a significant level of stray noise signals corresponding to clock signals used to switch the display elements therein. It has been found that when conventional RAG type electronic writeboards are installed in close proximity to plasma display panels, the electronic writeboards pick up these stray noise signals affecting adversely their operation. Accordingly, electronic writeboards suitable for use with noisy display panels are desired.

It is therefore an object of the present invention to provide a novel touch sensitive display panel and an electronic writeboard for a noisy display panel.

SUMMARY OF THE INVENTION

According to one aspect of the present invention there is provided a touch sensitive display panel comprising:

a noisy display panel having a display screen on which images are displayed; and an electronic writeboard on said noisy display panel and overlying said display screen, said electronic writeboard detecting user input and providing output to alter said images, said electronic writeboard including means to compensate for noise generated by said noisy display panel.

Preferably, the compensation means inhibits the electronic writeboard from processing the user input upon detection of noise from the noisy display panel that is above a predetermined threshold value.

In a preferred embodiment, the electronic writeboard includes a generally transparent, touch sensitive panel overlying the display screen of the noise display panel. The touch sensitive panel generates contact position data signals in response to user input made via contact with the touch sensitive panel. A controller receives the output of the touch sensitive panel and processes the contact position data signals. A noise detector detects noise signals emitted by the noisy display panel and inhibits the controller from processing the contact position data signals when the presence of noise signals generated by the noisy display panel is above the predetermined threshold value. The noise signals are picked up by the touch sensitive panel and are superimposed on the contact position data signals when user input is made.

Also, in a preferred embodiment, the noise detection includes a peak detector generating positive and negative envelopes of the input; a combiner to combine the positive and negative envelopes; and a comparator to compare the combined positive and negative envelopes with the predetermined threshold level and to output an active digital level when the noise level exceeds the predetermined threshold. A high pass filters the input prior to the input being applied to the peak detector. A limiter is interposed between the high pass filter and the peak detector.

Preferably, the controller enables the touch sensitive panel at intervals to allow the touch sensitive panel to generate the contact position data signals in response to the user input and initiates a timer upon enablement of the touch sensitive panel to count a predetermined duration. The controller monitors the output of the noise detector over the predetermined duration to detect the presence of noise signals and reads and processes the contact position data signals when the timer counts the predetermined duration and no noise is detected by the noise detector over the predetermined duration. The controller also monitors the output of the noise detector during reading of the contact position data signals and inhibits processing of the contact position data signals and reinitiates the timer when noise is detected by the noise detector during reading.

According to another aspect of the present invention there is provided a touch sensitive display panel comprising:

a plasma display panel having a display screen on which images are displayed; and an electronic writeboard including a generally transparent touch sensitive panel overlying said display screen, said touch sensitive panel generating contact position data signals in response to user input made via contact with said touch sensitive panel; a controller receiving the output of said touch sensitive panel and processing said contact position data signals thereby to change images displayed on said display screen; and a noise detector inhibiting said controller from processing said contact position data signals when the presence of noise signals generated by said plasma display panel is above said predetermined threshold value.

According to yet another aspect of the present invention there is provided an electronic writeboard for a noisy display panel comprising:

a generally transparent touch sensitive panel to overlie a display screen of said noisy display panel, said touch sensitive panel generating contact position data signals in response to user input made via contact with said touch sensitive panel;

a controller receiving the output of said touch sensitive panel and processing said contact position data signals thereby to detect the position of contact made with a touch sensitive panel; and a noise detector for detecting noise signals emitted by said noisy display panel, said noise detector inhibiting said controller from processing said contact position data signals when the presence of noise signals generated by said noisy display panel is above said predetermined threshold value.

According to still yet another aspect of the present invention there is provided a touch sensitive display panel comprising:

a noisy display panel having a display screen on which images are displayed; and an electronic writeboard on said plasma display panel and overlying said display screen and through which said images are visible, said electronic writeboard including a controller detecting user input and providing output to alter said images and a noise detector sensing noise emitted by said noisy display panel, said controller inhibiting processing of said user input when noise is detected by said noise detector.

According to still yet another aspect of the present invention there is provided a touch sensitive panel comprising:

a noisy display panel having a display screen on which images are displayed; and an electronic writeboard on said noisy display panel and overlying said display screen and through which said images are visible, said electronic writeboard including a touch sensitive panel overlying said display screen; a controller to read contact position data from said touch sensitive panel generated in response to user input; and timing means to enable said controller to process said contact position data signals when noise generated by said noisy display panel is below a predetermined threshold level.

By synchronizing its data acquisition timing to avoid noise signals emitted by the noisy display panel, the electronic writeboard can be positioned in close proximity to the noisy display panel without stray noise from the noisy display panel adversely its operation. This allows the electronic writeboard to be used in conjunction with a plasma display panel yielding a touch sensitive plasma display panel.

BRIEF DESCRIPTION OF THE DRAWINGS

An embodiment of the present invention will now be described more fully with reference to the accompanying drawings in which:

FIG. 1a is a front elevational view of a touch sensitive display panel in accordance with the present invention;

FIG. 1b is an exploded side elevational view of the touch sensitive display panel of FIG. 1a;

FIG. 1d is a side elevational view of the touch sensitive display panel of FIG. 1a;

DETAILED DESCRIPTION OF THE PREFERRED EMBODIMENT

Figure 1D:
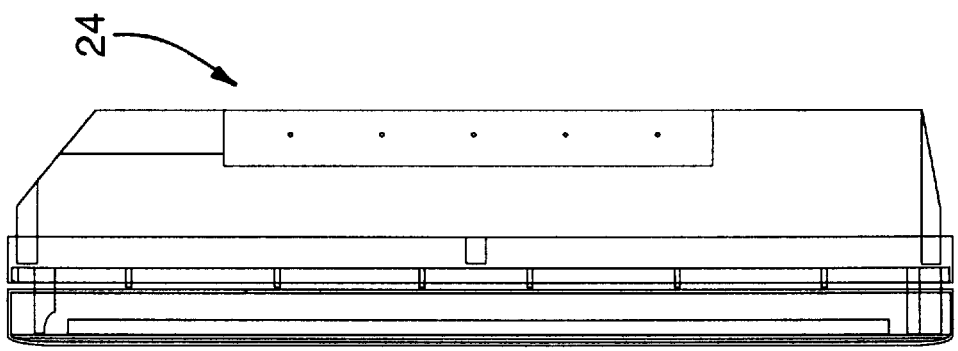
Figure 1B:
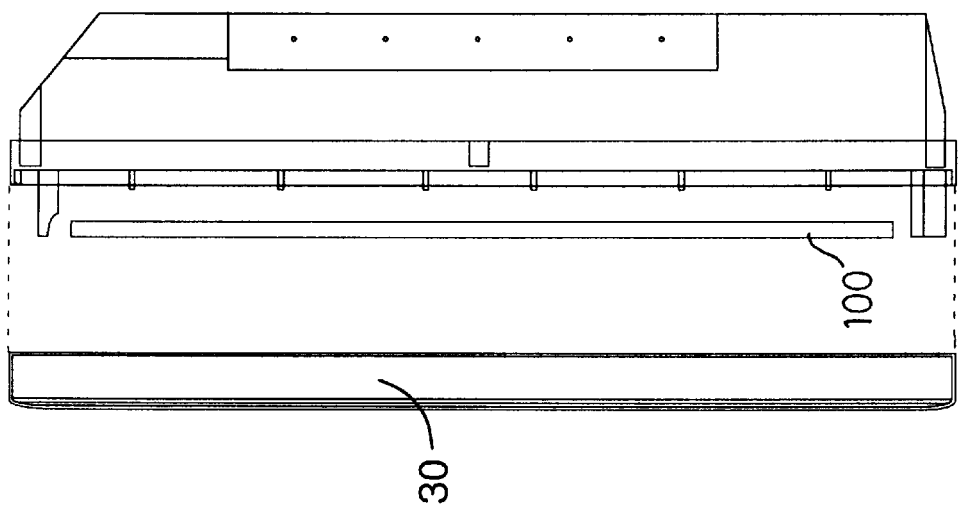
Figure 1C:
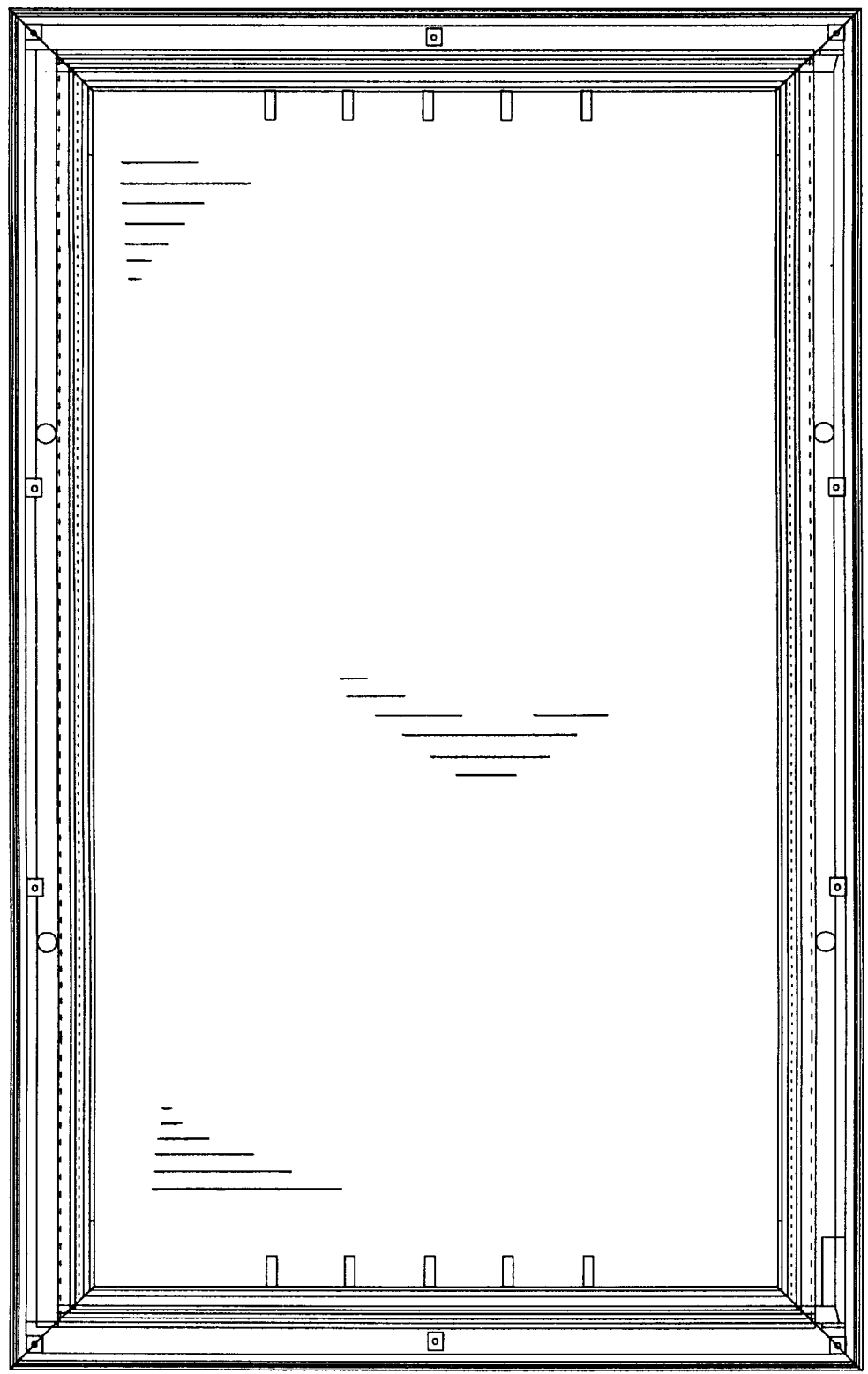
FIG. 1c is a front elevational view of the touch sensitive display panel of FIG. 1a showing back details.

Referring now to FIGS. 1a to 1d and 2, a touch sensitive display panel is shown and is generally referred to by reference numeral 20. Touch sensitive display panel 20 includes an electronic writeboard (EWB) 22 overlying the display screen of a noisy display panel 24 such as for example a plasma display panel (PDP) as illustrated. Within the context of the present application, noisy display panels refer in general to noisy display panels that emit noise signals which affect the operation of EWBs.

The PDP 24 includes a housing 26 accommodating a protective layer of glass 28 and EMI and IR shielding layers. Surrounding the protective layer is a front bezel 30. The EWB 22 is placed over the protective layer of glass 28 and is sandwiched to the front bezel 30 by conventional metal fingers 32 (not shown) used for shielding. The metal fingers 32 ensure a transition connection between the front surface of the EMI shielding layer and the housing 26. The metal fingers 32 and the EMI shielding layer are attached to the front bezel 30 for conventional removal. The PDP 24 is conventional and therefore, since the specifics of PDPs are known, further details of the PDP and its operation will not be described herein.

Figure 2:
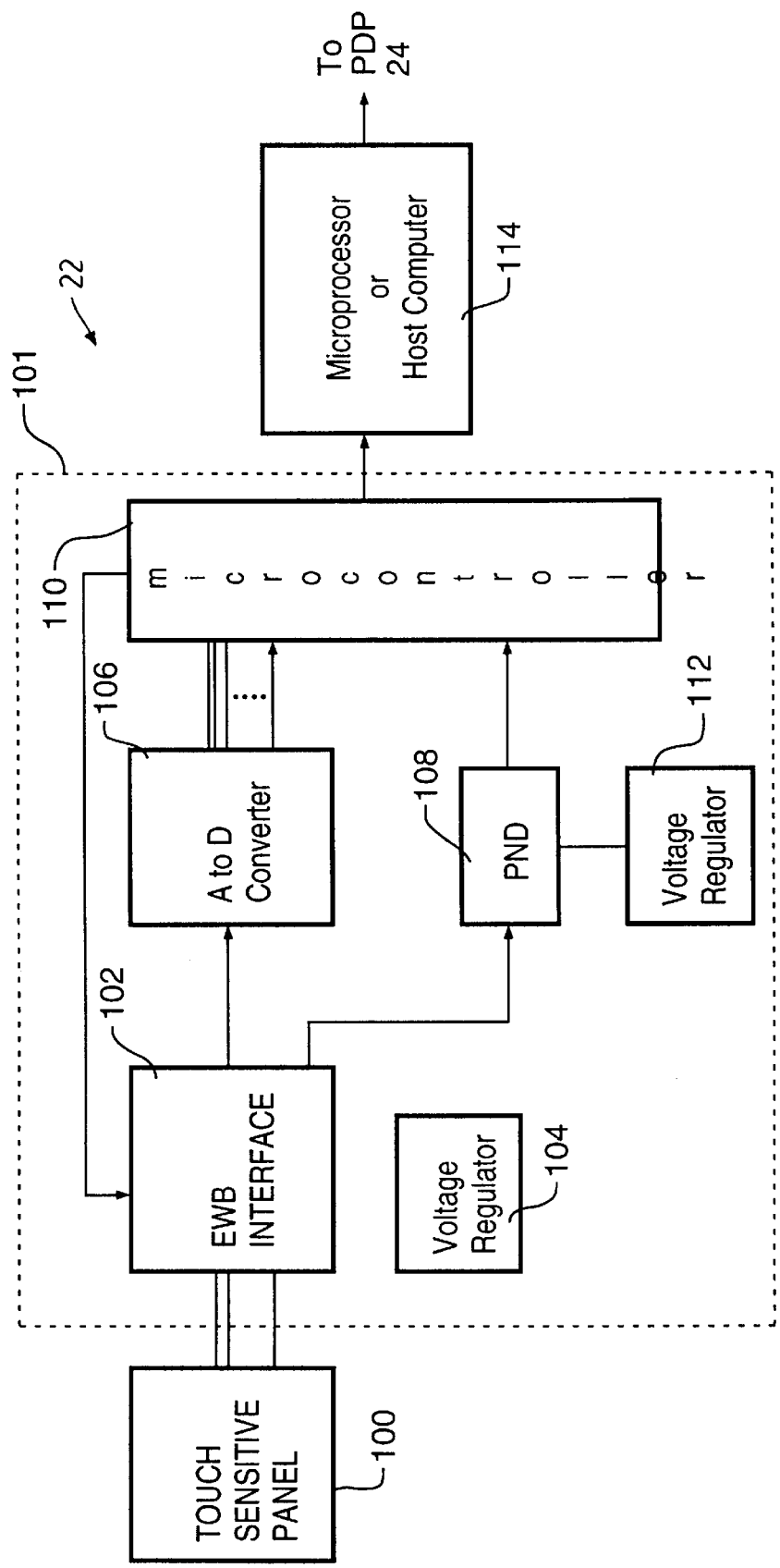
FIG. 2 is a block diagram of an electronic writeboard forming part of the touch sensitive display panel of FIGS. 1a to 1d.
Figure 3A:
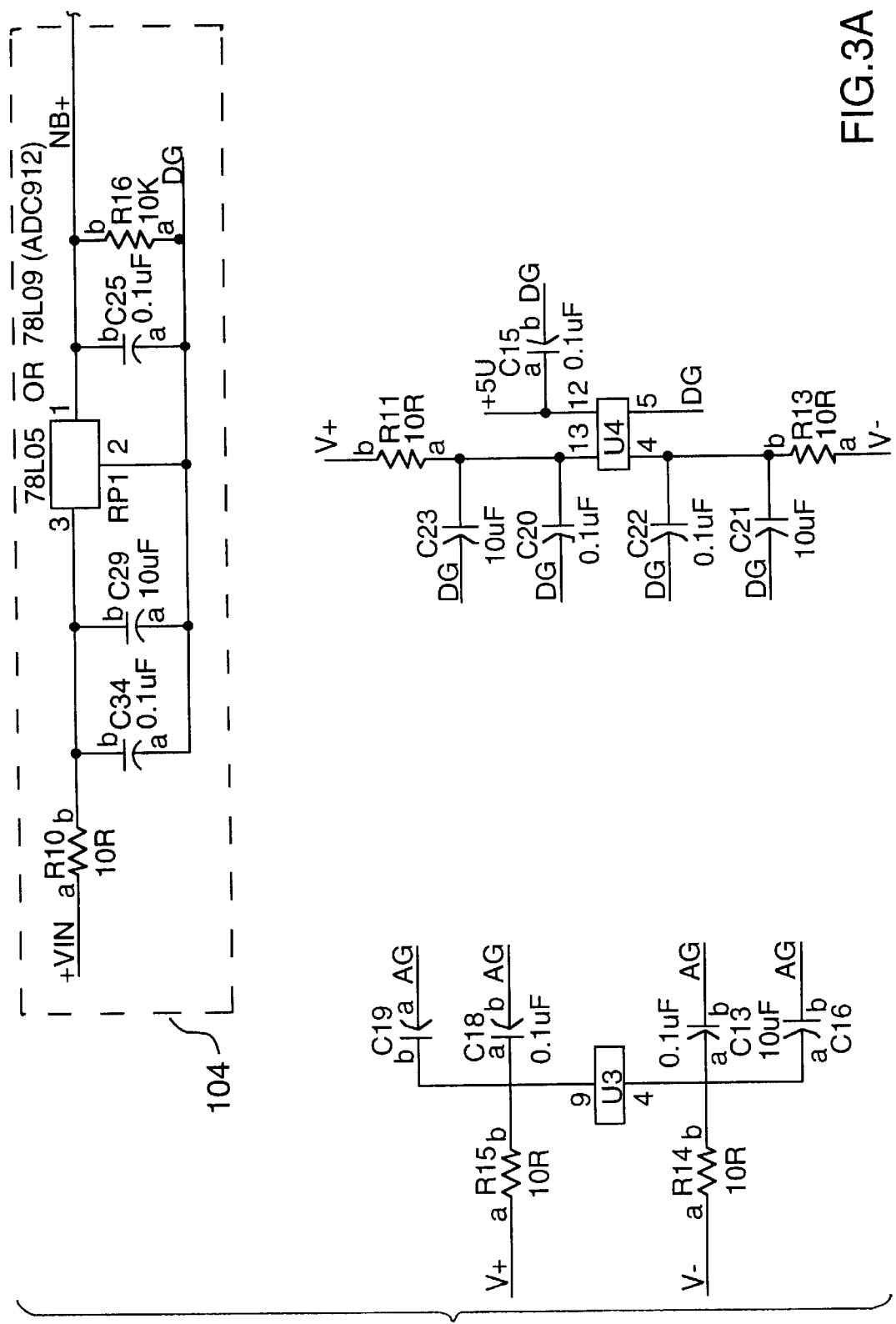
FIG. 3 is a circuit diagram of an electronic writeboard interface forming part of the electronic writeboard of FIG. 2.
Figure 3B:
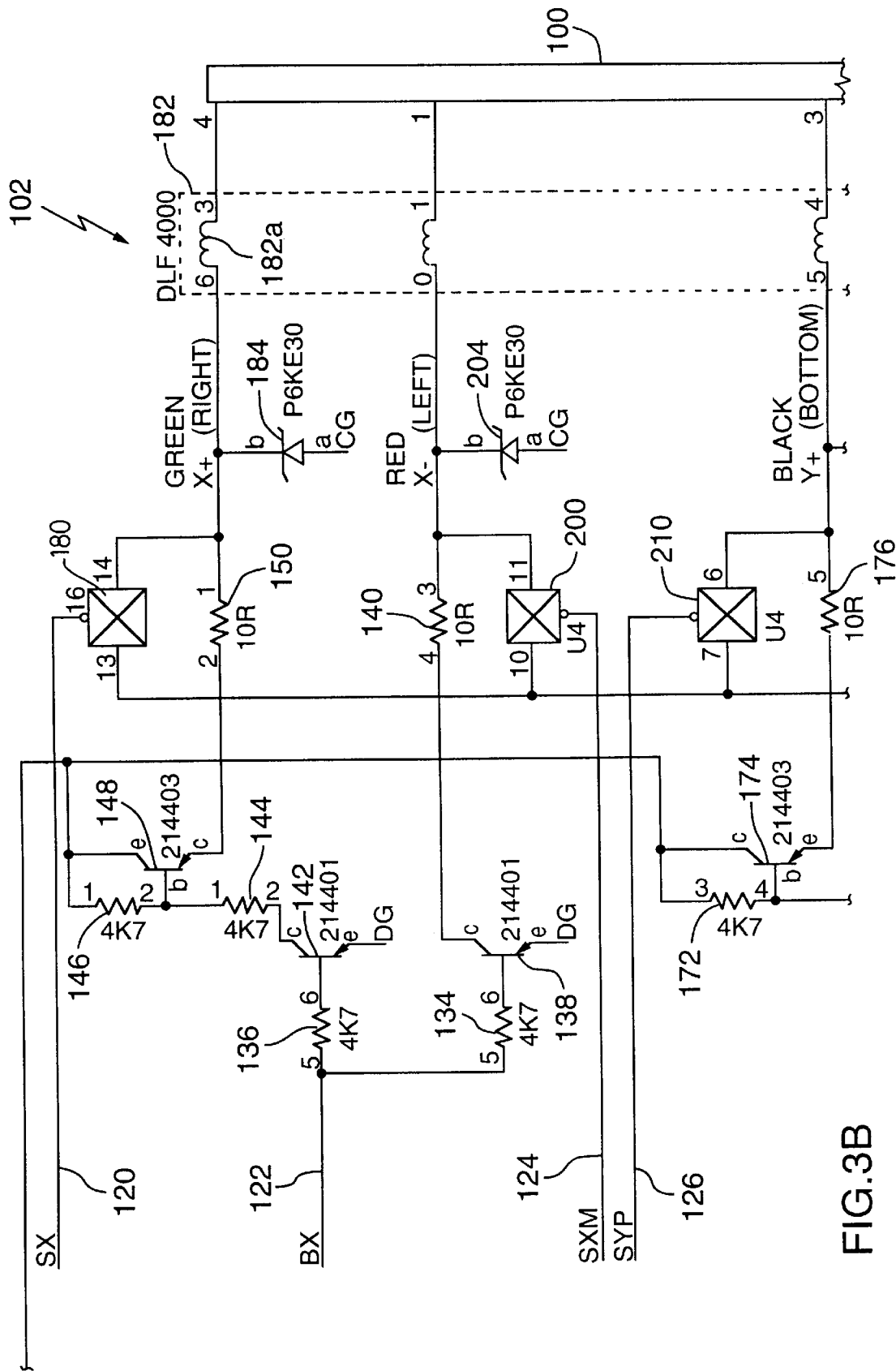
Figure 3C:
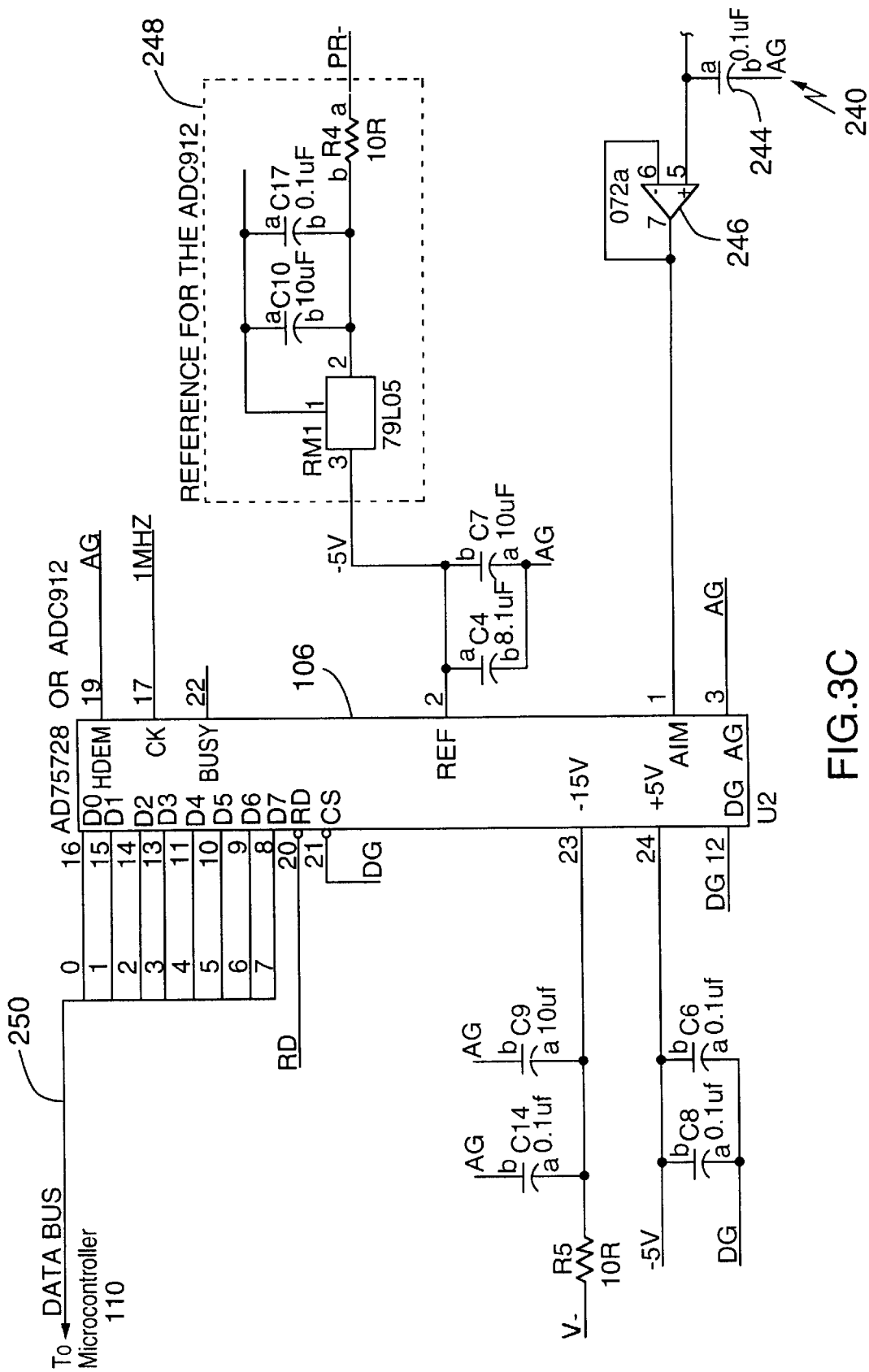
Figure 3D:
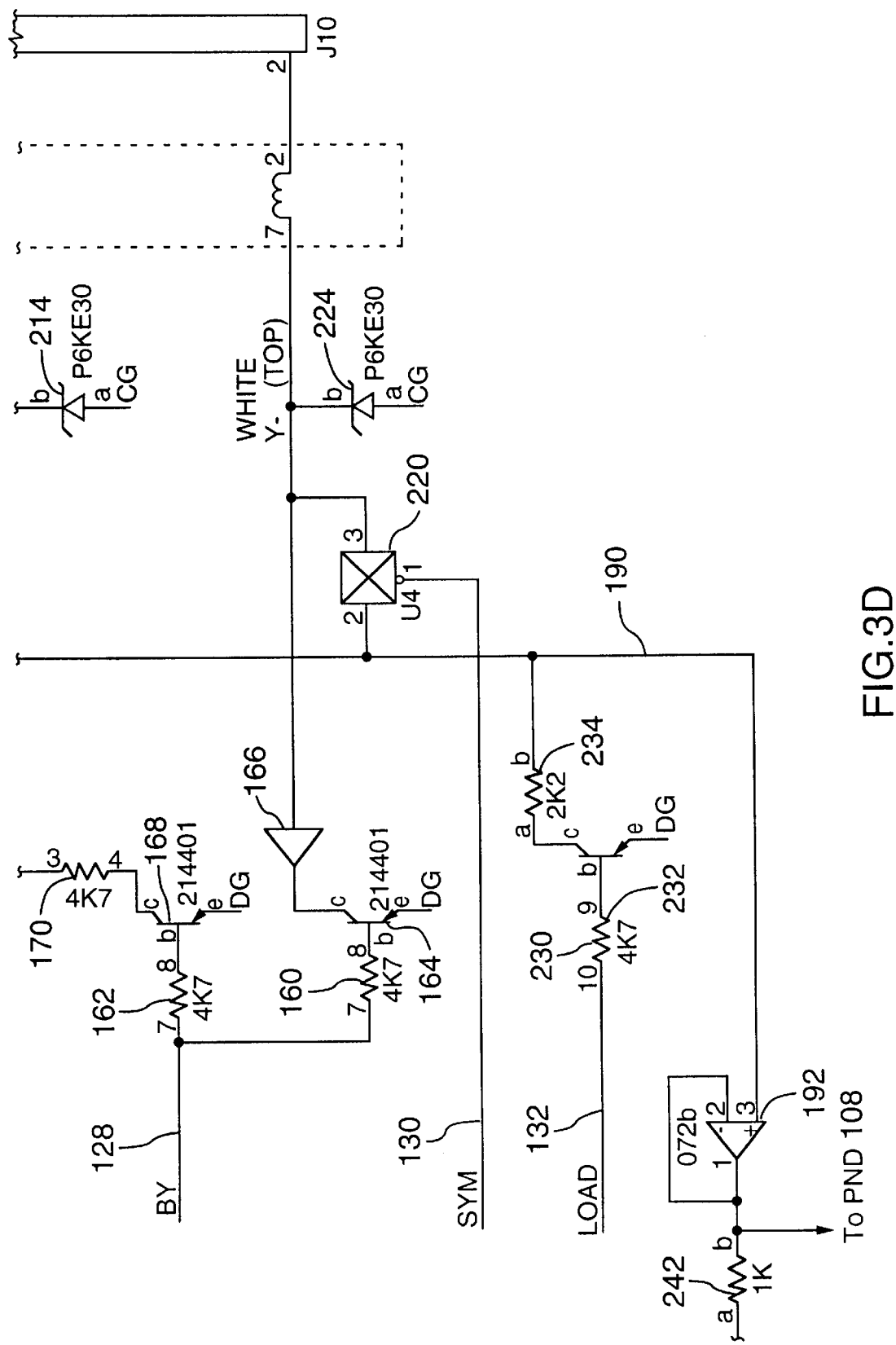

FIG. 2 better illustrates the EWB 22 in block form and as can be seen, the EWB 22 includes a touch sensitive, multi-layer, generally transparent, flexible panel 100 under tension to which a touch sensitive panel controller 101 is connected. Touch sensitive panel 100 includes spaced X and Y surfaces (not shown) to which electrodes are connected. Touch sensitive panel controller 101 includes an EWB interface 102 connected to a voltage regulator 104 as well as to an analog to digital (A to D) converter 106 and to a plasma noise detector (PND) 108. A to D converter 106 and PND 108 are connected to a microcontroller 110, which provides output to the EWB interface 102 as well as to a host computer 114. A filtered power supply 112 supplies power to the PND 108.

The host computer 114 executes one or more applications programs and provides output to the plasma display panel 24 so that graphics, text, etc. and other images are displayed on the display screen and are visible through the touch sensitive panel 100. The touch sensitive panel controller 101 detects user input generated in response to pressure applied to the touch sensitive panel 100 using a marker, pointer, stylus, finger, etc. to bring the X and Y surfaces into contact and outputs contact position data signals. The contact position data signals are in the form of analog voltages representing the X and Y coordinates on the touch sensitive panel 100 where contact is made. The contact position data signals are processed by the microcontroller 110 before being conveyed to the host computer 114 and used by the host computer to update the images displayed on the display screen of the plasma display panel 24 in the appropriate manner. The above-described operation of the EWB 22 is conventional.

Referring now to FIG. 3, the EWB interface 102 is better illustrated. As can be seen, the EWB interface 102 includes seven input lines, namely an SXP input line 120, a DX input line 122, an SXM input line 124, and SYP input line 126, a DY input line 128, an SYM input line 130 and a LOAD input line 132. The input lines 120 to 132 are connected to the microcontroller 110 and receive control signals therefrom as will be described. DX input lines 122 leads to two resistors 134 and 136 respectively. Resistor 134 leads to the base of transistor 138. The emitter of transistor 138 is coupled to digital ground DG which can be noisy. The collector of the transistor 138 leads to a resistor 140.

Resistor 136 leads to the base of a transistor 142. The emitter of transistor 142 is coupled to digital ground DG. The collector of transistor 142 leads to a resistor 144. Resistor 144 is also connected to resistor 146 as well as to the base of a transistor 148. The emitter of the transistor 148 is connected to the resistor 146 as well as to the WB output pin of the voltage regulator 104. The collector of transistor 148 is connected to a resistor 150.

DY input line 128 leads to two resistors 160 and 162 respectively. Resistor 160 leads to the base of a transistor 164. The emitter of transistor 164 is coupled to digital ground DG. The collector of the transistor 164 leads to the cathode of a switching diode 166. Resistor 162 leads to the base of a transistor 168. The emitter of transistor 168 is coupled to digital ground DG. The collector of transistor 168 leads to a resistor 170. Resistor 170 is also connected to resistor 172 as well as to the base of a transistor 174. The emitter of the transistor 174 is connected to the resistor 172 as well as to the WB output pin of the voltage regulator 104. The collector of transistor 174 is connected to a resistor 176.

Resistor 150 is connected to pin 14 of an analog switch 180, to a common mode EMI noise filter 182 having four coils 182a to 182d wound around a common core (not shown) and to the cathode of a transient suppression zener diode 184. The anode of zener diode 184 is connected to a low impedance chassis ground designed to absorb electrostatic discharge (ESD) hits. Pin 16 of analog switch 180 is connected to the SXP input line 120 while pin 15 of analog switch 180 is connected to a line 190 leading to the inverting terminal of an op-amp configured as a buffer 192.

Resistor 140 is connected to pin 11 of an analog switch 200, to the EMI noise filter 184 and to the cathode of a transient suppression zener diode 204. The anode of zener diode 204 is connected to chassis ground CG. Pin 9 of analog switch 200 is connected to the SXM input line 124 while pin 10 of analog switch 200 is connected to line 190 leading to buffer 192.

Resistor 176 is connected to pin 6 of an analog switch 210, to the EMI noise filter 184 and to the cathode of a transient suppression zener diode 214. The anode of zener diode 214 is connected to chassis ground CG. Pin 8 of analog switch 210 is connected to the SYP input line 126 while pin 7 of analog switch 210 is connected to line 190 leading to buffer 190.

The anode of switching diode 166 is connected to pin 3 of an analog switch 220, to the EMI noise filter 184 and to the cathode of a transient suppression zener diode 224. The anode of zener diode 224 is connected to chassis ground CG. Pin 1 of analog switch 220 is connected to the SYM input line 130 while pin 2 of analog switch 220 is connected to line 190 leading to buffer 192.

Coil 182a of the EMI noise filter 184 interconnects the resistor 150 and the X$^+$ electrode (not shown) on the X surface of the touch sensitive panel 100. Coil 182b of the EMI noise filter 184 interconnects the resistor 140 and the X$^-$ electrode (not shown) on the X surface of the touch sensitive panel 100. Coil 182c of the EMI noise filter 184 interconnects the resistor 176 and the Y$^+$ electrode (not shown) on the Y surface of the touch sensitive panel 100. Coil 182d of the EMI noise filter 184 interconnects the switching diode 166 and the Y$^-$ electrode (not shown) on the Y surface of the touch sensitive panel 100.

Load input line 132 is connected to a resistor 230 which is also connected to the base of a transistor 232. Emitter of transistor 232 is connected to digital ground DG while the collector of transistor 232 is connected to a resistor 234. Resistor 234 is also connected to line 190 leading to buffer 192.

The output terminal of buffer 192 is connected to the input terminal of the PND 108 as well as to a filter 240 constituted by a resistor 242 and a capacitor 244 connected to analog ground AG. The output of the filter 240 is applied to the non-inverting terminal of another op-amp configured as a buffer 246. The output terminal of the buffer 246 is connected to the Ain pin of A to D converter 106. A to D converter 106 receives input from a reference voltage source 248 and provided digital output to the microcontroller 110 via a data bus 250.

Figure 4A:
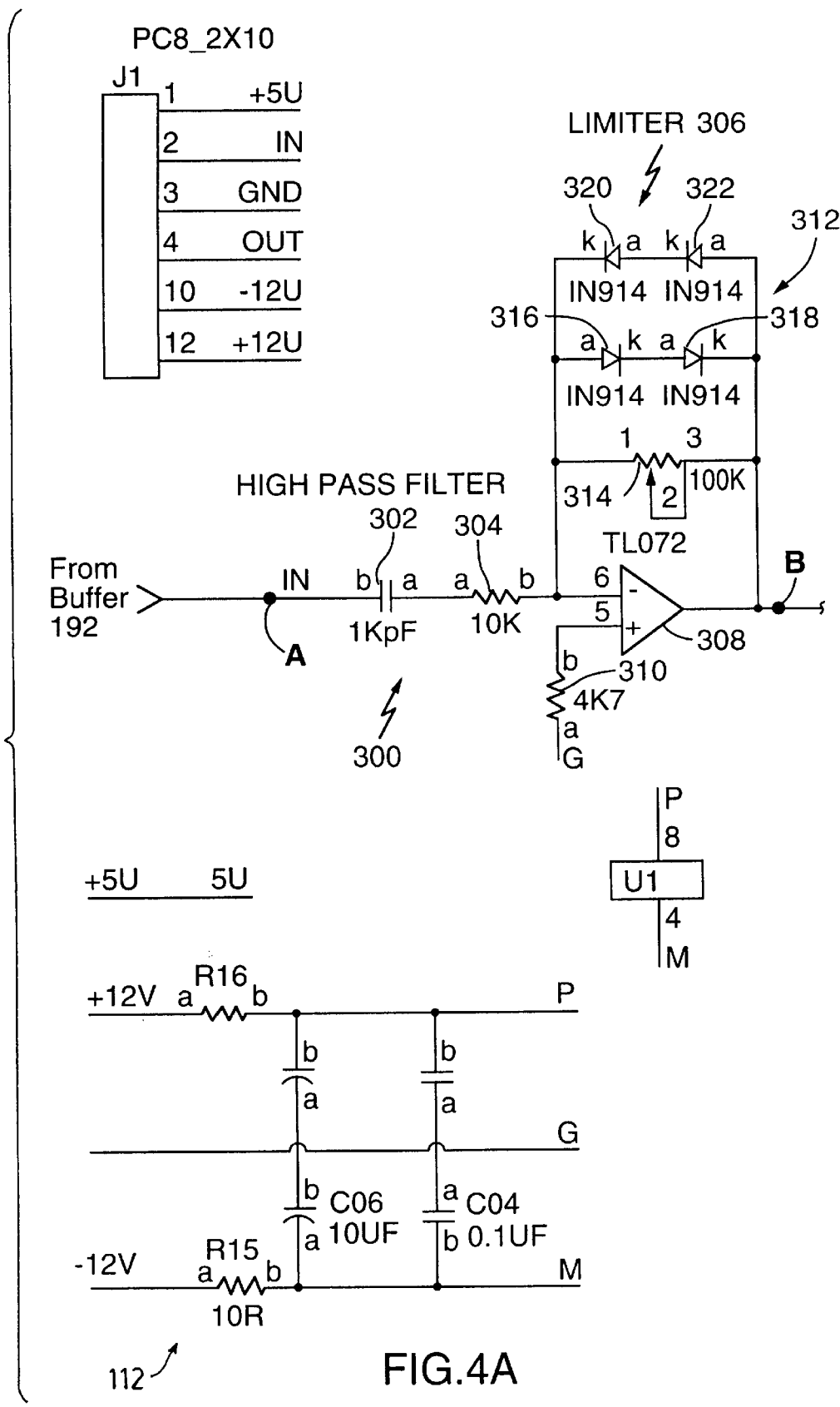
FIG. 4 is a circuit diagram of a plasma noise detector forming part of the electronic writeboard of FIG. 2.
Figure 4B:
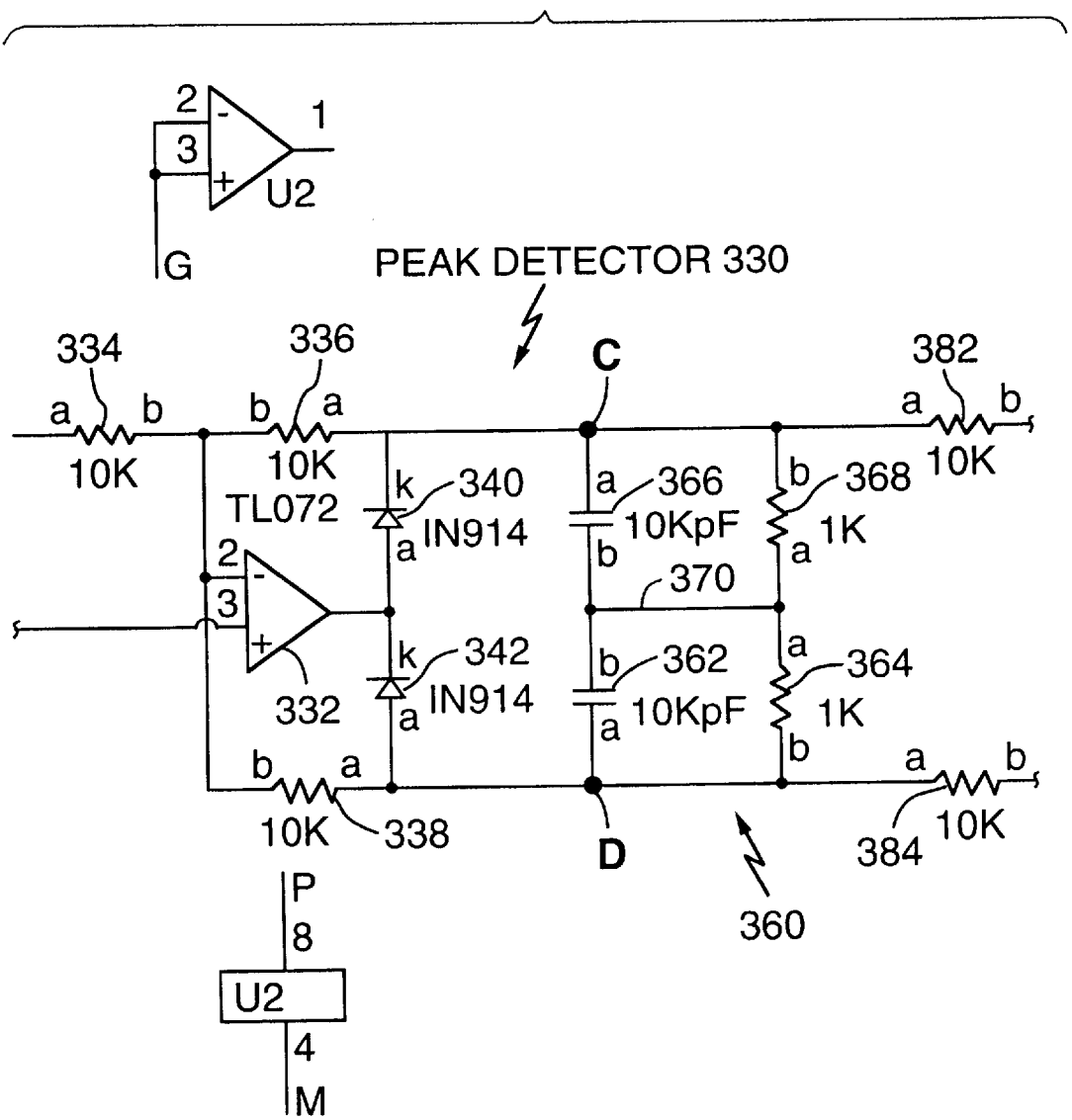
Figure 4C:
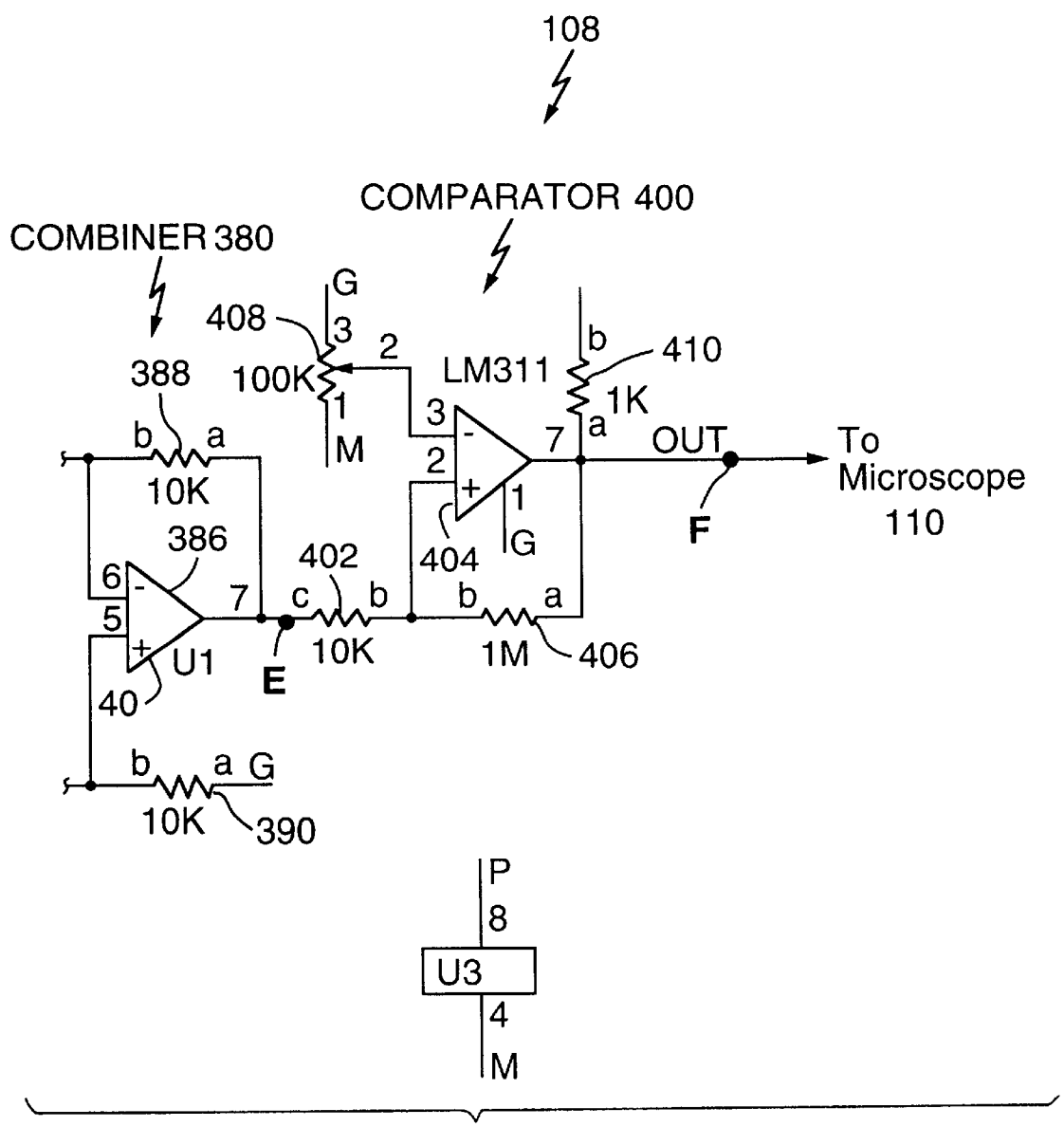

Referring now to FIG. 4, the PND 108 is better illustrated. As can be seen, the PND 108 includes a high pass filter 300 constituted by a capacitor 302 and a resistor 304 connected in series. The output of the high pass filter 300 is applied to a limiter 306. Limiter 306 includes an op-amp 308 having a non-inverting terminal connected to ground G by way of resistor 310. The inverting terminal of op-amp 308 is coupled to its output terminal by way of a ladder 312. The ladder 312 includes a first step in the form of a potentiometer 314, a second step including a pair of forwardly biased, series connected clamping diodes 316 and 318 respectively and a third step including a pair of reversed biased, series connected clamping diodes 320 and 322 respectively.

The output of limiter 306 is applied to a peak detector 330. Peak detector 330 includes an op-amp 322 having a non-inverting terminal receiving the output of the limiter 306. The inverting terminal of the op-amp 332 is connected to a resistor 334 leading to ground G, to a resistor 336 as well as to a resistor 338. Resistor 336 is connected to the output terminal of op-amp 332 by way of a reversed biased diode 340 while resistor 338 is connected to the output terminal of op-amp 332 by way of a forward biased diode 342. The output of the peak detector 330 includes a positive envelope appearing on resistor 336 and a negative envelope appearing on resistor 338.

The positive and negative envelopes output by the peak detector 330 are applied to a filter 360. Filter 360 includes a capacitor 362 and a resistor 364 connected in parallel, both of which receive the negative envelope output by the peak detector 330. Filter 360 also includes a capacitor 366 and a resistor 368 connected in parallel, both of which receive the positive envelope output by the peak detector 330. Capacitors 362 and 366 and resistors 364 and 368 are coupled to ground G via a common line 370.

The output of the filter 360 is applied to a combiner 380. Combiner 380 includes a resistor 382 receiving the filter positive envelope and a resistor 384 receiving the filtered negative envelope. Resistor 382 is connected to the inverting terminal of an op-amp 386 as well as to a resistor 388. Resistor 384 is connected to the non-inverting terminal of op-amp 386 as well as to a resistor 390. Resistor 390 is coupled to ground G while resistor 388 is connected to the output terminal of the op-amp 386.

The output of the combiner 380 is applied to a comparator 400. Comparator 400 includes a resistor 402 connected to the output terminal of the op-amp 386. Resistor 402 receives the output of the combiner 380 and is connected to the non-inverting terminal of an op-amp 404 as well as to a resistor 406. The inverting terminal of the op-amp 404 is connected to a potentiometer 408. The terminals of the potentiometer 408 are connected between ground G and the −12 v output pin M of filtered power supply 112. Resistor 406 is also connected to the output terminal of the op-amp 404. The output terminal of the op-amp 404 is also connected to the +12 v output pin P of filtered power supply 112 by way of a resistor 410. The output terminal of the op-amp 404 constitutes the output of the PND 108 and leads to the microcontroller 110.

Figure 5:
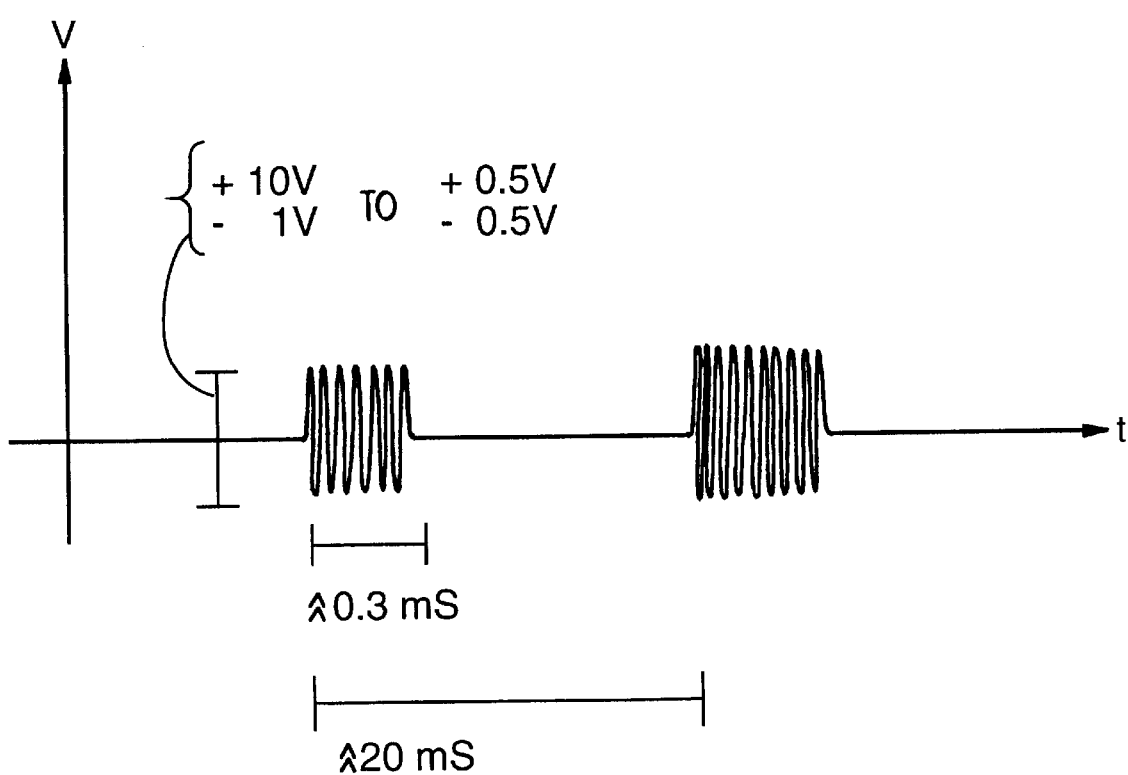
FIG. 5 is a representation of a stray noise signal generated by a plasma display panel forming part of the touch sensitive display panel of FIGS. 1a to 1d.

The operation of the touch sensitive display panel 20 and specifically, the touch sensitive panel controller 101 will now be described with particular reference to FIGS. 2 to 16. When the PDP 24 is operating and the display elements of the PDP 24 are being switched, stray noise signals are generated by the PDP 24 corresponding to the plasma display panel clock signals. FIG. 5 shows a representation of such a stray noise signal. As can be seen, depending on installation variables, the amplitude of the noise signal can vary between approximately +10 v/−1 v peak to peak and +/−0.5 v peak to peak. The PDP 24 emits these stray noise signals in bursts interleaved with relatively quiet emissions corresponding to the PDP refresh cycles. The EWB 22 which is in close proximity to and overlies the protective layer 28 of the PDP 24, picks up these stray noise signals resulting in the stray noise signals being superimposed on signals generated by the EWB 22.

During operation of the EWB 22, the microcontroller 110 executes software allowing the microcontroller to enable the EWB interface 102 at selected intervals by supplying control signals to the input lines 120 to 132. The EWB interface 102, in response to the control signals from the microcontroller 110, cycles through its phases applying power to one of the X and Y surfaces of the touch sensitive panel 100 while measuring from the other and vice versa thereby allowing the EWB interface 102 to alternately measure the X and Y positions of contact points made on the touch sensitive panel 100.

The software executed by the microcontroller 110, which allows the microcontroller to control the EWB interface 102, functions as a real time Interrupt Service Routine (ISR). The EWB ISR is executed in short bursts but on a continuous basis. Thus, the microcontroller 110 executes sections of the EWB ISR code and then suspends execution of the EWB ISR code for a predetermined amount of time allowing other processes to run. A hardware timer (not shown) counts the predetermined amount of time and when the predetermined amount of time elapses, signals the microcontroller. The microcontroller 110 then awaits a wake-up call or interrupt generated by an internal time. Once the hardware timer has elapsed and the wake-up interrupt has been generated, the microcontroller 110 returns to the EWB ISR code and recommences execution of the EWB ISR code from the point where it stopped.

The microcontroller 110 also executes a PND ISR in response to a PND ISR interrupt generated in response to input received from PND 108 and sets a PND ISR flag when noise is detected. The PND ISR interrupt is given the highest interrupt priority by allowing the presence of noise appearing in contact position data signals to impact immediately the execution of the EWB ISR as will be described.

Figure 6:
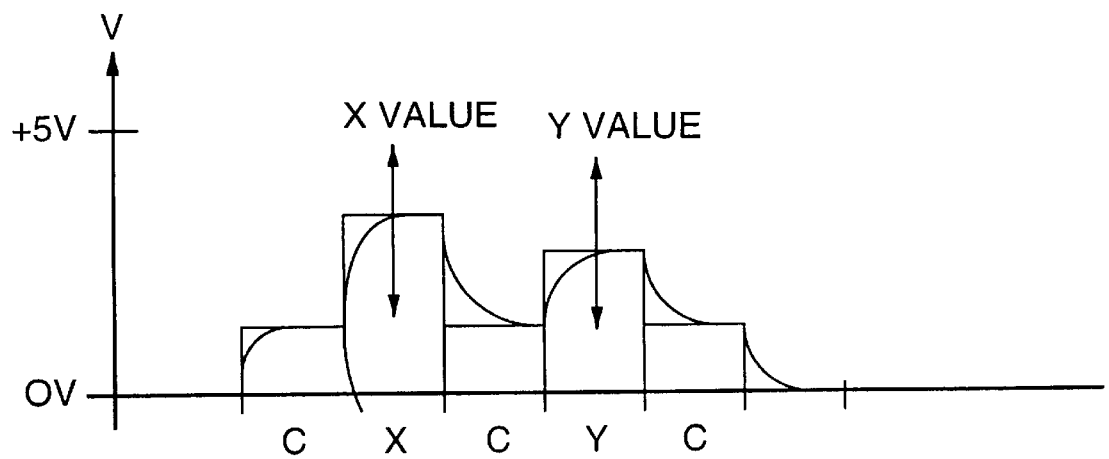
FIG. 6 is a representation of contact position data signals generated by the electronic writeboard of FIG. 2.

Specifically, when the EWB ISR code is executed, the microcontroller 110 examines the PND ISR flag every 100 $\mu$s to determine if it is set as will be described as well as initiates touch sensitive panel X and Y electrode read cycles. In the present embodiment as shown in FIG. 6, each touch sensitive panel X and Y electrode read cycle includes a first contact test C, followed by an X electrode read, followed by a second contact test C, followed by a Y electrode read and followed by a final contact test C. During each contact test, a drive current is supplied to the DY input line 128 and a load is applied to the X surface of the touch sensitive panel 100 via load input line 132. After a predetermined stabilization delay has elapsed, if the voltage signal appearing on the $X^+$ and $X^-$ electrodes, hence on line 190, is above a threshold, contact between X and Y surfaces of the touch sensitive panel 100 has occurred signifying to the microcontroller 110 that the touch sensitive panel 100 should be read to detect contact position data signals.

When the first contact test is performed and a voltage signal appears on line 190 that is above the threshold, it is detected by the microcontroller 110. The microcontroller 110 in turn closes analog switches 180 and 200 by applying a logic high voltage on the input lines 120 and 124 to connect the $X^+$ and $X^-$ electrodes to line 190. At the same time, the microcontroller 110 supplies a drive current to the DY input line 128 to energize the Y surface allowing X contact position data signals to be read from the touch sensitive panel 100. The operation is then reversed once the second contact test has been performed so that analog switches 210 and 220 are closed by applying a logic high voltage on input lines 126 and 130 to connect the $Y^+$ and $Y^-$ electrodes to line 190. At the same time, the microcontroller 110 supplies a drive current to the DX input line 122 to energize the X surface allowing Y contact position data signals to be read from the touch sensitive panel 100.

Figure 7A:
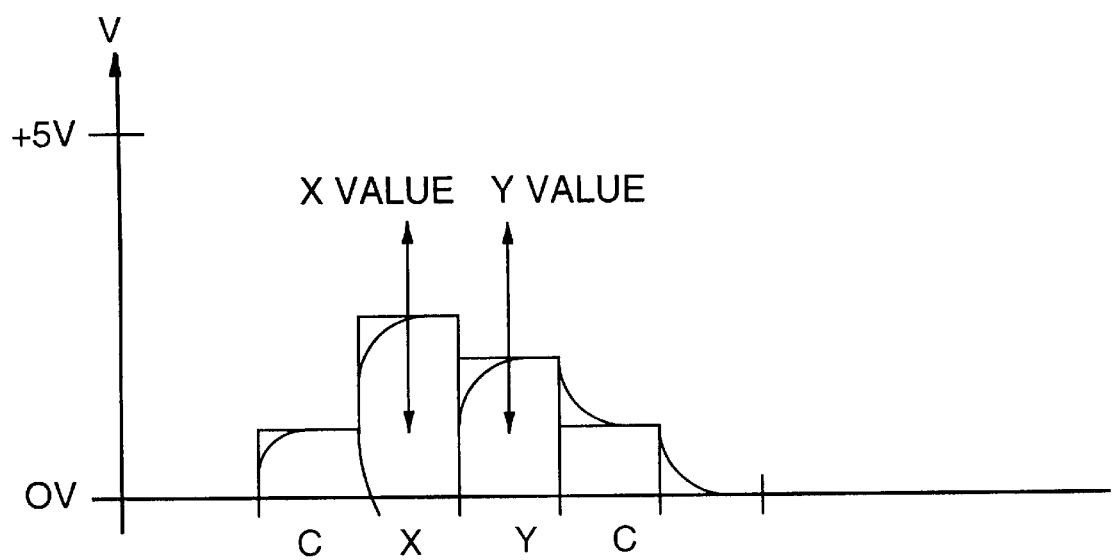
FIGS. 7a and 7b are alternative embodiments of contact position data signals.
Figure 7B:
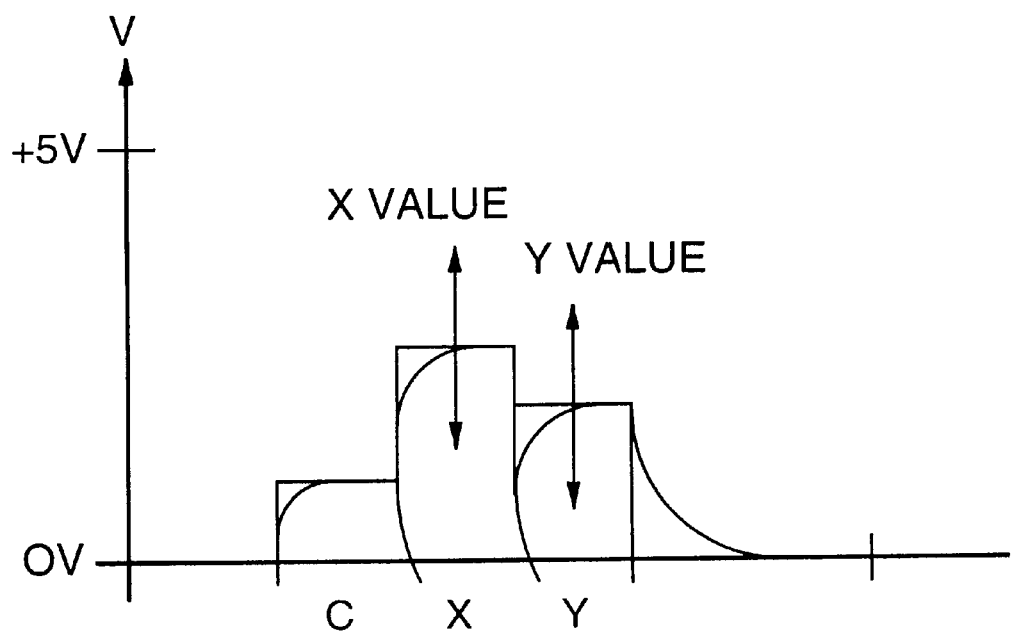

Although FIG. 6 shows contact tests being performed before, during and after the X and Y electrode reads, the three contact tests are not required. For example, as shown in FIG. 7a, contact tests may be performed before and after the X and Y electrode reads or alternatively as shown in FIG. 7b, a contact test may only be performed before the X and Y electrode reads.

During each contact test and also when a pair of analog switches has been closed to read either the X or Y electrodes, stray noise signals emitted by the PDP 24 are picked up by the electrodes being read and are superimposed on the contact test and contact position data signals. As mentioned previously, FIG. 5 shows a representation of a typical stray noise signal generated by the PDP 24. As should be apparent, there is no natural synchronization between the PDP stray noise signals and the contact position data signals nor is any inherent synchronization possible due to the fact that the PDP noise signals and the contact position data signals do not exhibit a high degree of repeatability or stable regularity.

The contact test and contact position data signals read from the electrodes that appear on line 190 are applied to the buffer 192. The signals are then passed to the PND 108 as well as to the buffer 246. Buffer 246 in turn conveys the signals to the A to D converter 106 which in turn converts the voltages of the signals into digital words that appear on the data bus 250. The microcontroller 110 reads the data bus 250 but before doing so, examines the status of the PND ISR flag to determine if it is set signifying that noise is present in the contact test and contact position data signals as will now be described.

When the signals are received by the PND 108, the PND examines the signals to determine if noise is present in the signals above a predetermined threshold value. If noise above the predetermined threshold value is present in the signals, the PND 108 outputs active digital signal levels which are applied to the microcontroller 110. The microcontroller 110 in turn stops acquiring data from the data bus 250 until signals appear at the PND 108 which do not include noise above the predetermined threshold value. The operation of the PND 108 and X and Y electrode read cycles will now be described more fully.

Specifically, when a signal is received from the buffer 192, it is applied to the high pass filter 300 so that only the active edge of the contact position data signals and the high frequency noise signals pass and proceed to the limiter 306. The limiter 306 clips the signals before passing the signals to the peak detector 330. The peak detector 330 generates a positive envelope of the signals as well as a negative envelope of the signals. The two envelopes are then passed through filter 360 before being applied to different terminals of the combiner 380.

Combiner 380 in turn combines the two envelopes by inverting the negative envelope and adding it to the positive envelope. The output of the combiner 380 is then applied to the comparator 400 which compares the output of the combiner 380 with a threshold determined by the setting of the potentiometer 408. When the potentiometer setting is below the voltage level of the combiner output, the output of the comparator 400 remains high but when the voltage level of the combiner output falls below the potentiometer setting, the output of the comparator 400 goes low resulting in an active digital signal level being applied to the microcontroller 110. The microcontroller 110 triggers the PND ISR interrupt on the negative edge of the comparator output causing the microcontroller to execute the PND ISR.

Figure 8:
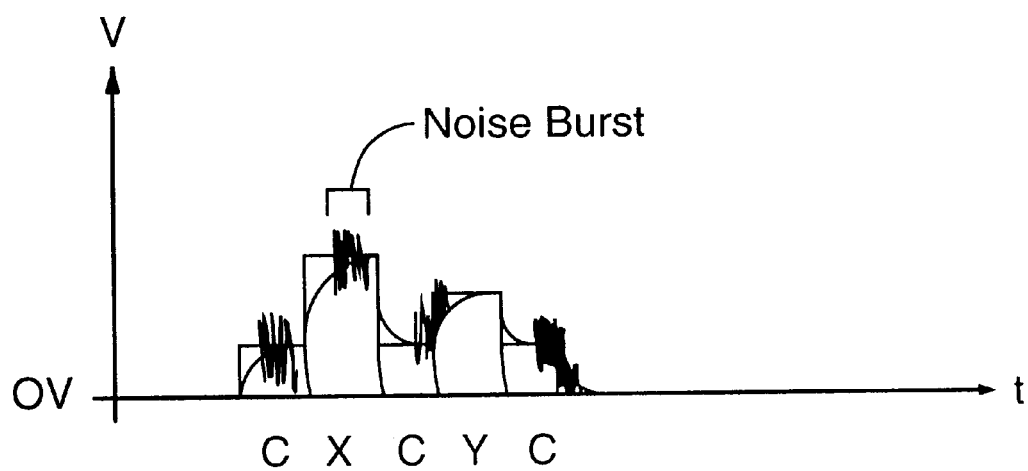
FIG. 8 is a representation of an input signal to the plasma noise detector of FIG. 4 generated by the electronic writeboard interface of FIG. 3.
Figure 9:
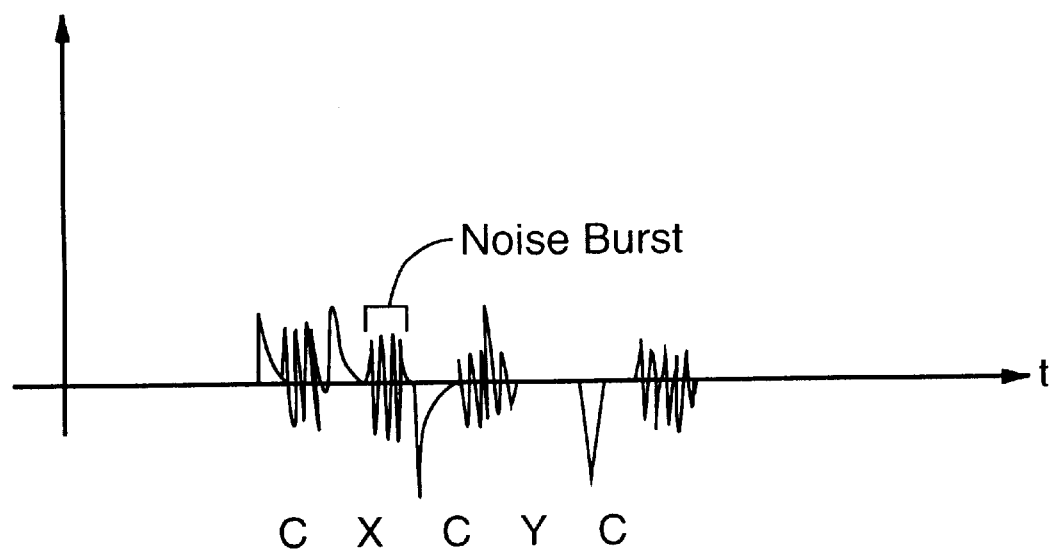
FIG. 9 is a representation of the input signal of FIG. 8 after passing through a high pass filter and limiter forming part of the plasma noise detector of FIG. 4.
Figure 10:
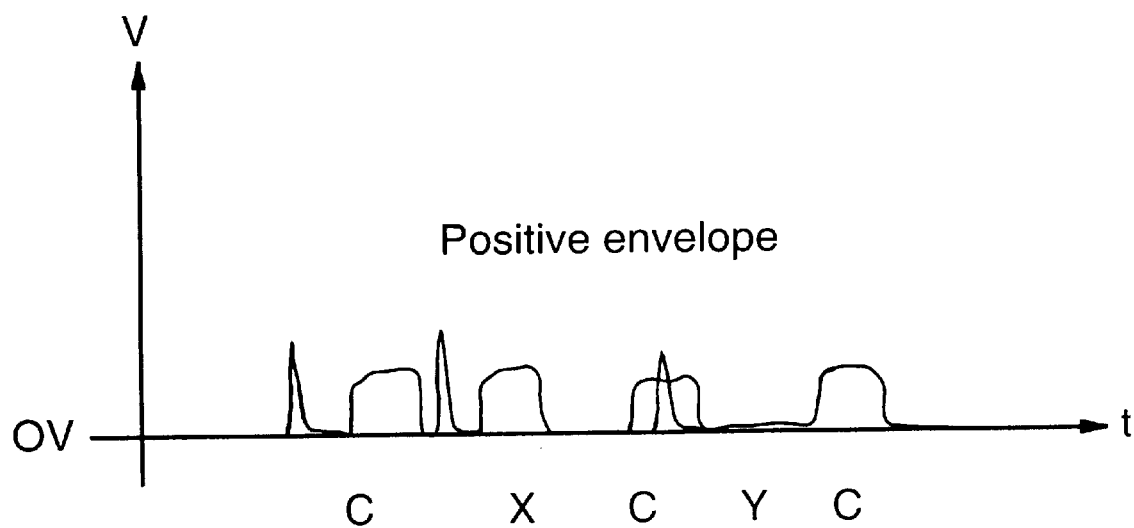
FIG. 10 is a representation of the signal of FIG. 9 after passing through a positive peak detector forming part of the plasma noise detector of FIG. 4.
Figure 11:
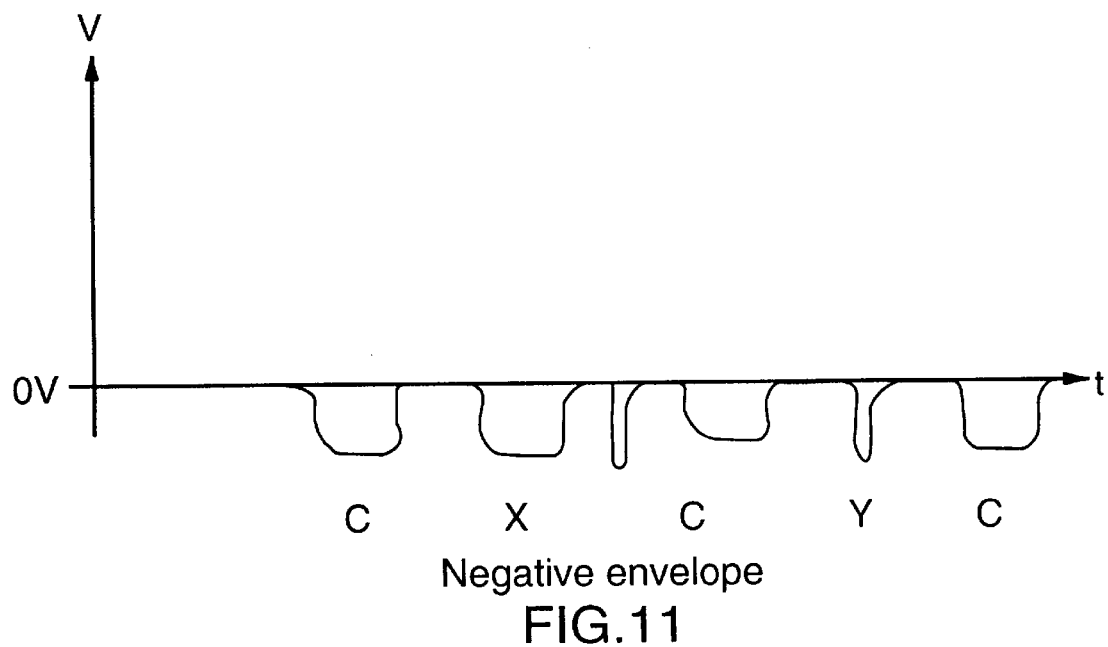
FIG. 11 is a representation of the signal of FIG. 9 after passing through a negative peak detector forming part of the plasma noise detector of FIG. 4.
Figure 12:
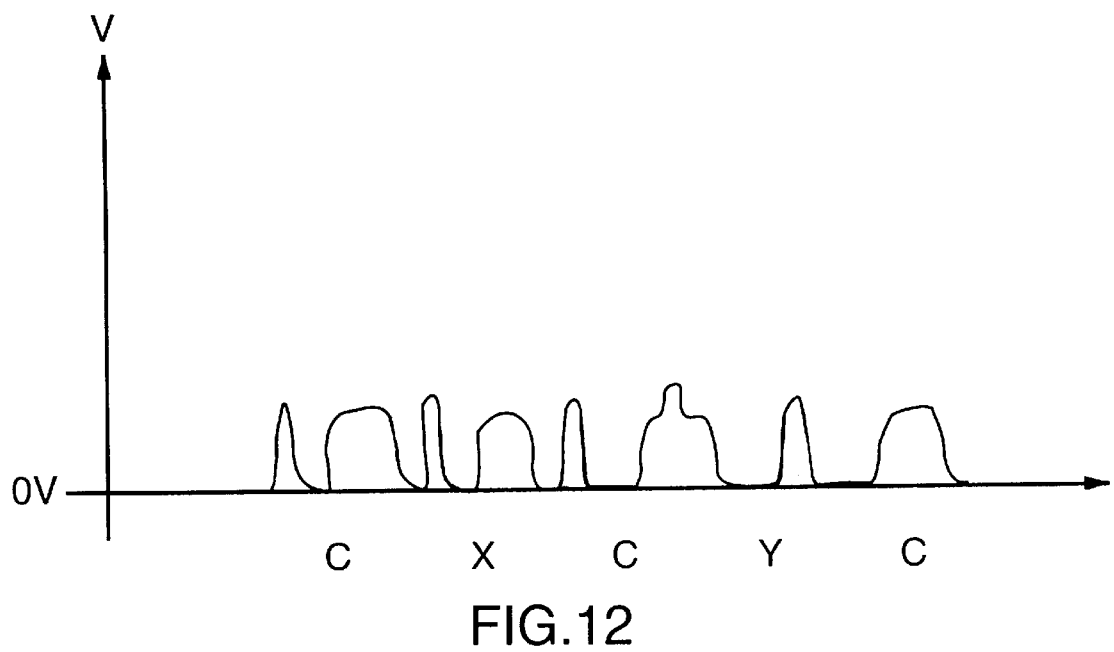
FIG. 12 is a representation of the signals of FIGS. 10 and 11 after passing through a combiner forming part of the plasma noise detector of FIG. 4.
Figure 13:
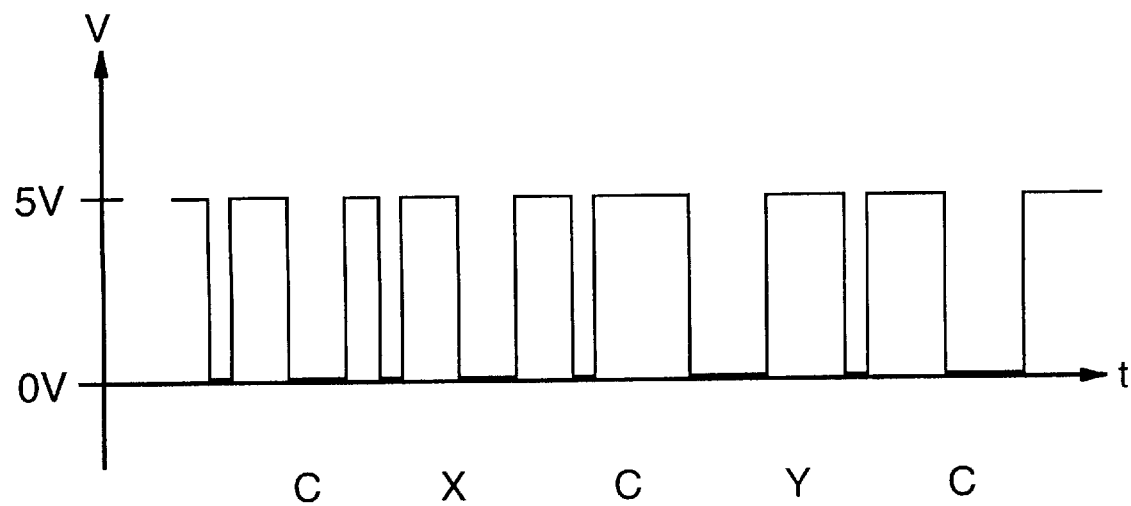
FIG. 13 is a representation of the signals of FIG. 12 after passing through a comparator forming part of the plasma noise detector of FIG. 4.
Figure 14:
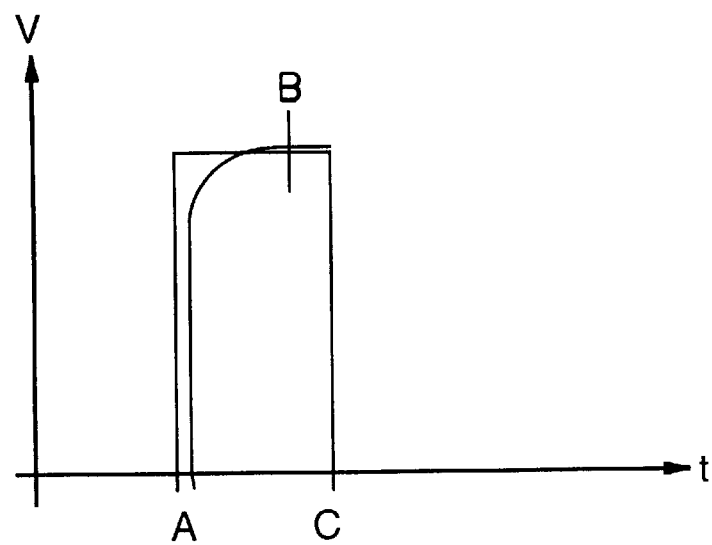
FIG. 14 illustrates the conventional timing used by conventional electronic writeboards to read contact position data signals.

Referring now to FIGS. 8 to 13, representations of signals at various stages of the PND 108 are shown. In particular, FIG. 8 shows an example of noisy contact test and contact position data signals input to the PND 108 by the buffer 192 and appearing at node A in FIG. 4. FIG. 9 shows the signals of FIG. 8 after having passed through the high pass filter 300 and limiter 306 as it appears at node B in FIG. 4. FIG. 10 shows the positive envelope generated by the peak detector 300 after receiving the signals of FIG. 9 as it appears at node C in FIG. 4 while FIG. 11 shows the negative envelope generated by the peak detector 300 after receiving the signals of FIG. 9 as it appears at node D in FIG. 3. FIG. 12 illustrates the output of the combiner 380 appearing at node E in FIG. 4 after receiving the positive and negative envelopes. FIG. 13 shows the output of the comparator 400 appearing at node F of FIG. 4 generated in response to the combiner input. As can be seen, noise in the input signals received by the PND 108 that are also applied to the A to D converter 106, results in active digital signal levels being applied to the microcontroller 110.

Figure 15:
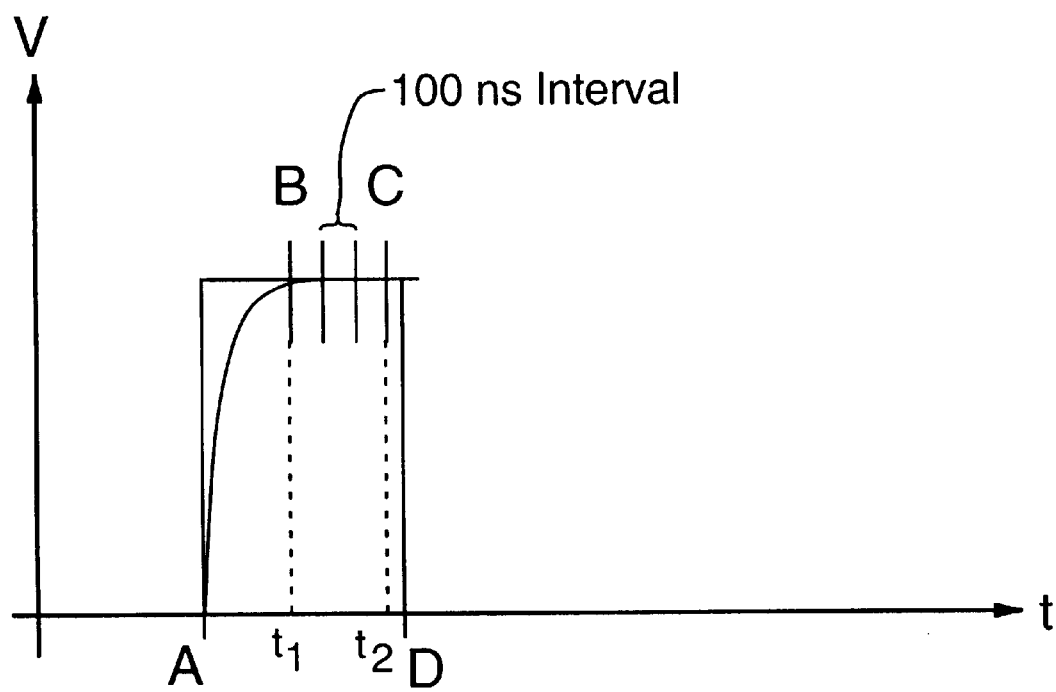
FIG. 15 illustrates the timing used by a microcontroller forming part of the electronic writeboard of FIG. 2 to read contact position data signals.

During a touch sensitive panel X or Y electrode read cycle, the EWB ISR is executed by the microcontroller 110 to the point where a pair of analog switches are triggered to allow an electrode pair to be read as is identified at point A in FIG. 15. The microcontroller 110 then suspends execution of the EWB ISR for a short, fixed stabilization delay interval as represented by blocks 810 and 811 in FIG. 16. Following the stabilization delay interval as identified by time $t_1$ (point B), the microcontroller 110 resumes operation (block 812), enables the PND ISR (block 814), sets the next wake up interval (block 820) and exits (block 821) entering a sleep interval. If noise is detected by the PND 108 during the EWB ISR sleep interval, a PND ISR interrupt is generated and the microcontroller 110 executes the PND ISR to set the PND ISR flag. The EWB ISR wakes up at 100 $\mu$s intervals and at each wake up call, verifies the presence of noise during the previous interval by examining the PND ISR flag to determine if it has been set. If no noise is detected, the EWB ISR continues its execution but if noise is detected, the process restarts and the EWB ISR returns to its starting point at time $t_1$ (point B). This ensures that a quiet time has occurred before the microcontroller 110 acquires X or Y contact position data.

Figure 16:
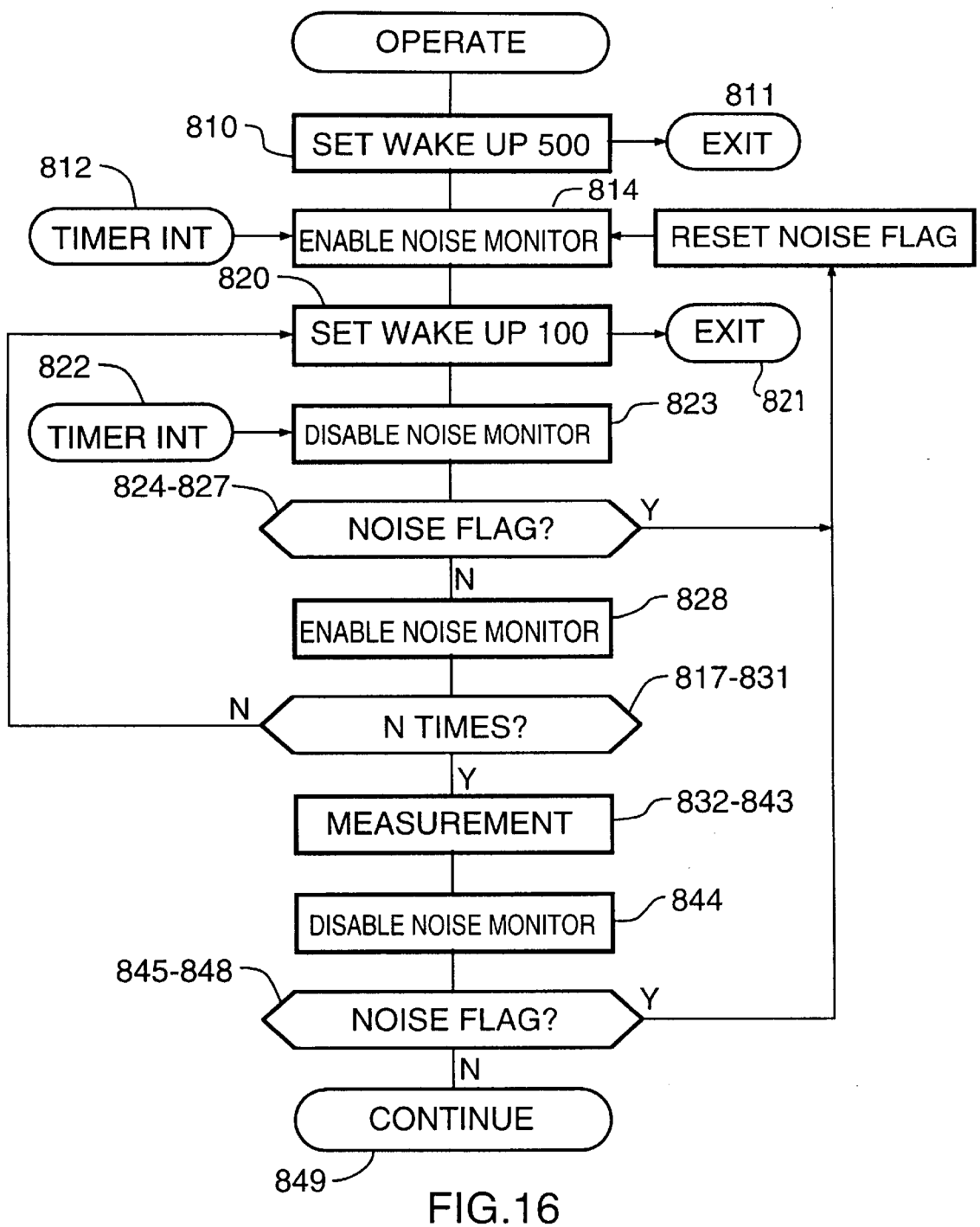
FIG. 16 is a flowchart illustrating the steps performed by the microcontroller forming part of the electronic writeboard of FIG. 2 in response to output received from the plasma noise detector of FIG. 4.

At time $t_2$ (point C), the microcontroller 1010 reads the data bus 250 with or without extra delays, but before accepting the data, checks the PND ISR flag to determine if noise has occurred during the electrode read cycle. If no noise is detected, the microcontroller 110 accepts the data. However, if noise has occurred, the EWB ISR returns to its starting point at time $t_1$ (point B). FIG. 16 is a flow chart illustrating the above steps and Appendix A is a section of the PND ISR software code.

As will be appreciated, the microcontroller 110 is only allowed to accept contact position data signals when no significant noise is picked up by the touch sensitive panel 100 during the X and Y electrode read cycles. This inhibits noise signals generated by the plasma display panel 24 from corrupting the contact position data signals.

Although the preferred embodiment of the touch sensitive display panel 20 has been described as including an EWB overlying the display screen of a plasma display panel, it should be appreciated that the EWB can be used with other noisy display panels which emit stray noise in bursts interleaved with generally quiet emissions.

Although the EWB interface 102 as shown includes four wires leading from corresponding electrodes of the touch sensitive panel, it will be appreciated that the EWB interface may include five or more wires leading from corresponding electrodes of the touch sensitive panel. In the cases where five wire touch sensitive panels are used, four of the wires are used to apply current to the electrodes of the touch sensitive panel while the fifth wire is used for sensing the electrodes of the touch sensitive panel.

In addition, although the host computer executing the applications programs is shown external to the EWB 22, it should be appreciated by those of skill in the art that a microprocessor may be incorporated into the EWB 22 allowing the EWB to execute applications programs and provide output directly to the plasma display panel to update images displayed on the display screen thereof.

Although a particular embodiment of the present invention has been described, those of skill in the art will appreciate that variations and modifications may be made without departing from the spirit and scope thereof as defined by the appended claims.

We claim:

1. A touch sensitive display panel comprising:
    a noisy display panel having a display screen on which images are displayed; and an electronic writeboard on said noisy display panel and overlying said display screen, said electronic writeboard detecting user input and providing output to said noisy display panel, said electronic writeboard including means to compensate for noise generated by said noisy display panel, said compensation means inhibiting said electronic writeboard from processing of said user input upon detection of noise from said noisy display panel.

2. A display panel as defined in claim 1 wherein said compensation means inhibits said electronic writeboard from processing said user input upon detection of noise from said noisy display panel above a threshold value.

3. A display panel as defined in claim 2 wherein said electronic writeboard provides output to said noisy display panel to cause said noisy display panel to alter said images in response to said user input.

4. A display panel as defined in claim 2 wherein said electronic writeboard includes a generally transparent touch sensitive panel overlying said display screen, said touch sensitive panel generating contact position data signals in response to user input made via contact with said touch sensitive panel, a controller receiving the output of said touch sensitive panel and processing said contact position data signals; and a noise detector for detecting noise signals emitted by said noisy display panel, said noise detector inhibiting said controller from processing said contact position data signals when the presence of noise signals generated by said noisy display panel is above said threshold value.

5. A display panel as defined in claim 4 wherein said noise signals are picked up by said touch sensitive panel and are superimposed on said contact position data signals when user input is made, said noise detector receiving the output of said touch sensitive panel.

6. A display panel as defined in claim 5 wherein said controller reads the output of said touch sensitive panel after a predetermined amount of time has elapsed without a change in the output of said noise detector occurring thereby to acquire said contact position data signals.

7. A display panel as defined in claim 6 wherein said noise detector outputs active digital levels in response to input signal levels above said threshold value.

8. A display panel as defined in claim 7 wherein said noise detector includes a peak detector generating positive and negative envelopes of said input; a combiner to combine said positive and negative envelopes; and a comparator to compare said combined positive and negative envelopes with said threshold level and to output said active digital level.

9. A display panel as defined in claim 8 wherein said noise detector further includes a high pass filter to filter said input prior to said input being applied to said peak detector.

10. A display panel as defined in claim 9 wherein said noise detector further includes a limiter interposed between said high pass filter and said peak detector.

11. A display panel as defined in claim 5 wherein said controller enables said touch sensitive panel at intervals to allow said touch sensitive panel to generate said contact position data signals in response to said user interface and initiates a timer upon enablement of said touch sensitive panel to count a predetermined duration, said controller monitoring the output of said noise detector over said predetermined duration to detect the presence of noise signals, said controller reading and processing said contact position data signals when said timer counts said predetermined duration and no noise above said threshold value is detected by said noise detector over said predetermined duration.

12. A display panel as defined in claim 11 wherein said timer is reset when noise above said threshold value is detected during said predetermined duration.

13. A display panel as defined in claim 12 wherein said controller monitors the output of said noise detector during reading of said contact position data signals, said controller inhibiting processing of said contact position data signals and reinitiating said timer when noise is detected by said noise detector above said threshold value.

14. A touch sensitive display panel comprising:
a plasma display panel having a display screen on which images are displayed; and
an electronic writeboard including a generally transparent touch sensitive panel overlying said display screen, said touch sensitive panel generating contact position data signals in response to user input made via contact with said touch sensitive panel; a controller receiving the output of said touch sensitive panel and processing said contact position data signals thereby to change images displayed on said display screen; and a noise detector for detecting noise signals emitted by said plasma display panel, said noise detector inhibiting said controller from processing said contact position data signals when the presence of noise signals generated by said plasma display panel is above a threshold level.

15. A display panel as defined in claim 14 wherein said controller enables said touch sensitive panel at intervals to allow said touch sensitive panel to generate said contact position data signals in response to said user interface and initiates a timer upon enablement of said touch sensitive panel to count a predetermined duration, said controller monitoring the output of said noise detector over said predetermined duration to detect the presence of noise signals, said controller reading and processing said contact position data signals when said timer counts said predetermined duration and no noise above said threshold value is detected by said noise detector over said predetermined duration.

16. A display panel as defined in claim 15 wherein said inner timer is reset when noise above said threshold level is detected during said predetermined duration.

17. A display panel as defined in claim 16 wherein said controller monitors the output of said noise detector during reading of said contact position data signals, said controller inhibiting processing of said contact position data signals and reinitiating said timer when noise above said threshold level is detected by said noise detector.

18. A display panel as defined in claim 17 wherein said noise signals are picked up by said touch sensitive panel and are superimposed on said contact position data signals when user input is made, said noise detector receiving the output of said touch sensitive panel.

19. A display panel as defined in claim 18 wherein said noise detector includes a high pass filter receiving the output of said touch sensitive panel; a limiter receiving the output of said high pass filter; a peak detector receiving the output of said limiter and generating positive and negative envelopes of said input; a combiner to combine said positive and negative envelopes; and a comparator to compare said combined positive and negative envelopes with said threshold level, said comparator outputting an active digital level when the output of said touch sensitive panel is above said threshold level.

20. An electronic writeboard for a noisy display panel comprising:
a generally transparent touch sensitive panel to overlie a display screen of said noisy display panel, said touch sensitive panel generating contact position data signals in response to user input made via contact with said touch sensitive panel;

a controller receiving the output of said touch sensitive panel and processing said contact position data signals thereby to detect the position of contact made with said touch sensitive panel; and a noise detector for detecting noise signals emitted by said noisy display panel, said noise detector inhibiting said controller from processing said contact position data signals when the presence of noise signals generated by said noisy display panel is above a threshold value.

21. A display panel as defined in claim 20 wherein said controller enables said touch sensitive panel at intervals to allow said touch sensitive panel to generate said contact position data signals in response to said user interface and initiates a timer upon enablement of said touch sensitive panel to count a predetermined duration, said controller monitoring the output of said noise detector over said predetermined duration, said controller monitoring the output of said noise detector over said predetermined duration to detect the presence of noise signals, said controller reading and processing said contact position data signals when said timer counts said predetermined duration and no noise above said threshold value is detected by said noise detector over said predetermined duration.

22. An electronic writeboard as defined in claim 21 wherein said timer is reset when noise above said threshold value is detected during said predetermined duration.

23. An electronic writeboard as defined in claim 22 wherein said controller monitors the output of said noise detector during reading of said contact position data signals, said controller inhibiting processing of said contact position data signals and reinitiating said timer when noise above said threshold value is detected by said noise detector.

24. An electronic writeboard as defined in claim 23 wherein said noise signals are picked up by said touch sensitive panel and are superimposed on said contact position data signals when user input is made, said noise detector receiving the output of said touch sensitive panel.

25. An electronic writeboard as defined in claim 24 wherein said noise detector includes a high pass filter receiving the output of said touch sensitive panel; a limiter receiving the output of said high pass filter; a peak detector receiving the output of said limiter and generating positive and negative envelopes of said input; a combiner to combine said positive and negative envelopes; and a comparator to compare said combined positive and negative envelopes with said predetermined threshold level, said comparator outputting an active digital level when the output of said touch sensitive panel is above said threshold value.

26. A touch sensitive display panel comprising:

a noisy display panel having a display screen on which images are displayed; and an electronic writeboard on said noisy display panel and overlying said display screen and through which said images are visible, said electronic writeboard including a controller detecting user input and providing output to alter said images and a noise detector sensing noise emitted by said noisy display panel, said controller inhibiting processing of said user input when noise is detected by said noise detector.

27. A touch sensitive display panel comprising:

a noisy display panel having a display screen on which images are displayed; and an electronic writeboard on said noisy display panel and overlying said display screen and through which said images are visible, said electronic writeboard including a touch sensitive panel overlying said display screen; a controller to read contact position data from touch sensitive panel generated in response to user input; and timing means to enable said controller to process said contact position data signals when noise generated by said noisy display panel is below a threshold level, wherein said timing means includes a timer responsive to said controller, said controller initiating said timer at intervals to count a duration and monitoring the noisy display panel during the duration of said timer to detect noise above said threshold level, said controlling disregarding contact position data received from said touch sensitive panel during the duration of said timer when noise above said threshold level is detected.

28. A touch sensitive display panel as defined in claim 26 wherein said controller initiates a timer at intervals to count a duration and monitors said noise detector over the duration, said controller disregarding user input detected during said duration when said noise detector senses noise.

29. A touch sensitive display panel as defined in claim 28 wherein said noise detector is adjustable to sense noise above a set threshold level.

30. An electronic writeboard for a noisy display panel comprising:

a touch sensitive panel to overlie a display screen of said noisy display panel, said touch sensitive panel generating user input in response to contact thereon;

a controller detecting said user input and generating output to alter images displayed on said display screen; and a noise detector sensing noise emitted by said noisy display panel, said controller disregarding user input generated by said touch sensitive panel when noise is sensed by said noise detector.

31. An electronic writeboard as defined in claim 30 wherein said controller monitors said touch sensitive panel at intervals to detect user input received over the duration of each interval, said controller disregarding user input received over the duration of an interval when noise is sensed by said noise detector during that interval.

32. An electronic writeboard as defined in claim 31 wherein said noise detector sets a flag when noise over a threshold level is sensed, said controller examining said flag at the end of each duration to determine if said flag has been set, said controller generating output in response to user input if said flag has not been set and disregarding said user input if said flag has been set prior to resetting said flag.

33. An electronic writeboard as defined in claim 32 wherein said noise detector is adjustable to set the value of said threshold level.

34. An electronic writeboard for a noisy display panel comprising:

a touch sensitive panel to overlie a display screen of said noisy display panel, said touch sensitive screen generating contact position data in response to contact thereon;

a controller receiving said contact position data and in response generating output to alter images displayed on said display screen; and a timing mechanism enabling said controller to process said contact position data only when noise generated by said noisy display panel is below a threshold level, wherein said timing mechanism includes a timer responsive to said controller, said controller initiating said timer at intervals to count a duration and monitoring the noisy display panel during said duration to detect noise above said threshold level, said controller disregarding contact position data received from said touch sensitive panel during said duration when noise above said threshold level occurs during said duration.

35. An electronic writeboard for a noisy display panel comprising:

a touch sensitive panel to overlie a display screen of said noisy display panel, said touch sensitive screen generating contact data in response to contact thereon;

a controller acquiring the contact data at intervals and processing said data to generate output signals; and a synchronization mechanism in communication with said controller to time acquisition of the contact data by said controller to avoid data acquisition during noisy periods of said noisy display panel, wherein said synchronization mechanism includes a timer responsive to said controller, said controller initiating said timer at each interval to count a duration and monitoring the noisy display panel during said duration to detect noise above a threshold level, said controller disregarding contact data generated by the touch sensitive panel over the duration of an interval when noise above the threshold level occurs during that interval.

* * * * *